United States Patent
Grande et al.

(10) Patent No.: US 11,687,876 B2
(45) Date of Patent: *Jun. 27, 2023

(54) SYSTEM AND METHOD FOR RETAIL PLANNING WITH SMART PRODUCT ATTRIBUTES

(71) Applicant: Blue Yonder Group, Inc., Scottsdale, AZ (US)

(72) Inventors: Karine Grande, Montreal (CA); Gabrielle Gauthier Melancon, Montreal (CA)

(73) Assignee: Blue Yonder Gronn Inc, Scottsdale, AZ (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/341,014

(22) Filed: Jun. 7, 2021

(65) Prior Publication Data
US 2021/0295251 A1    Sep. 23, 2021

Related U.S. Application Data

(63) Continuation of application No. 16/185,983, filed on Nov. 9, 2018, now Pat. No. 11,030,574.
(Continued)

(51) Int. Cl.
*G06Q 10/08* (2023.01)
*G06Q 30/06* (2023.01)
(Continued)

(52) U.S. Cl.
CPC .......... *G06Q 10/087* (2013.01); *G06N 20/00* (2019.01); *G06Q 30/0621* (2013.01); *G06Q 30/0627* (2013.01); *G06Q 30/0631* (2013.01)

(58) Field of Classification Search
CPC ............. G06Q 10/087; G06Q 30/0621; G06Q 30/0677; G06Q 30/0631; G06Q 30/0627; G06N 20/00
See application file for complete search history.

(56) References Cited

U.S. PATENT DOCUMENTS 7,080,026 B2   7/2006   Singh et al.
7,395,229 B2   7/2008   Haeberli
(Continued)

OTHER PUBLICATIONS

Chen, Kuan-Ting; Chen, Kezchen; Cong, Peizhong; Hsu, Winton H.; and Luo, Jiebo. 2015. "Who are the Devils Wearing Prada in New York City?" In ACM Multimedia. 177-180., 4 pages, https://arxiv.org/pdf/1508.04785.pdf. (year: 2015).
(Continued)

*Primary Examiner* — Paul Danneman
(74) *Attorney, Agent, or Firm* — Spencer Fane LLP; Steven J. Laureanti

(57) ABSTRACT

A system and method are including a computer and a processor and memory. The computer receives a product class representing a product in a supply chain network including one or more supply chain entities and generates one or more new products for the product class using one or more automatically generated templates including a graphical representation of an exemplary product using a first smart product attribute value, the first smart product attribute value defined by a quantifiable measurement of a product attribute. The computer further causes items to be transported among the one or more supply chain entities to restock the inventory of the one or more items of the product class according to the current state of items in the supply chain network and the one or more new products.

20 Claims, 19 Drawing Sheets

Related U.S. Application Data

(60) Provisional application No. 62/724,366, filed on Aug. 29, 2018.

(51) Int. Cl.
    *G06N 20/00*    (2019.01)
    *G06Q 10/087*    (2023.01)
    *G06Q 30/0601*    (2023.01)

(56) References Cited

U.S. PATENT DOCUMENTS

| | | | |
|---|---|---|---|
| 8,504,398 B2 * | 8/2013 | Cihla | G06Q 30/02 705/7.29 |
| 11,030,574 B1 * | 6/2021 | Grande | G06N 20/00 |
| 2006/0155612 A1 * | 7/2006 | Haeberli | G06Q 30/0621 705/26.5 |

OTHER PUBLICATIONS

Kato, Natsumi; Osone, Hiroyuki; Sato, Daitetsu; Muramatsu, Naoya; and Ochiai, Yoichi. 2018. "DeepWear: a Case Study of collaborative Design between Human and AI". In ACM Multimedia., 8 pages, http://ligitalnature.slis.tsukuba.az.jp/wp-conent/uploads/2018/03/deepwear-authorvers (Year: 2018).

Yoo, Donggeun; Paeng, Kyunghyun; Park, Sunggyen; Lee, Jungin; Paek, Seungwook; Yoon, Sung-Eui; Kweon, In So, 2014. "PRISM: A System for Weighted Multi-color Browsing of Fashion Products". In WWW' 14 Companion. 151-154, 4 pages, https://sglab.kaist.ac.kr/PRISM/prism_www14.pdf. (Year 2014).

* cited by examiner

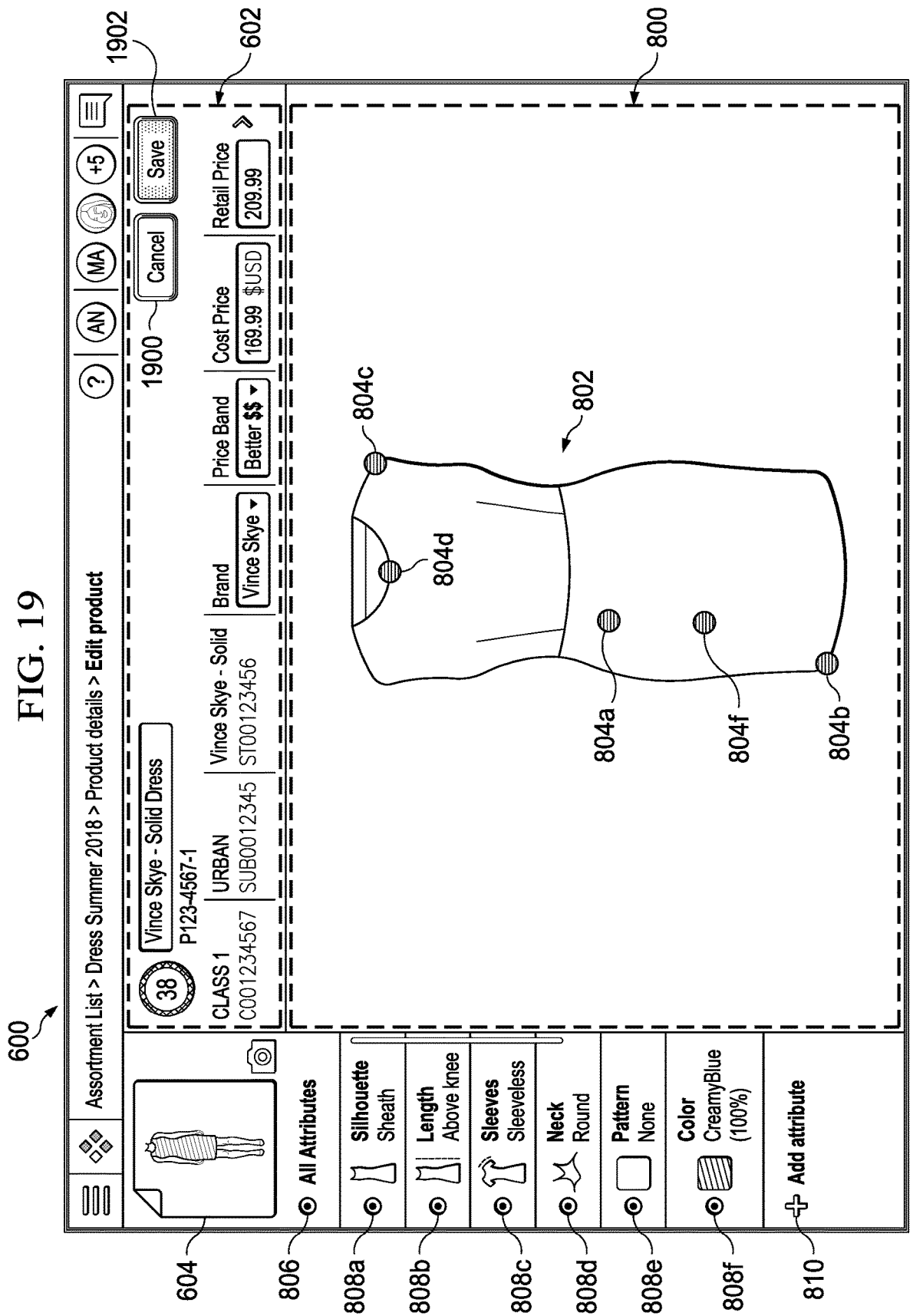

SYSTEM AND METHOD FOR RETAIL PLANNING WITH SMART PRODUCT ATTRIBUTES

CROSS-REFERENCE TO RELATED APPLICATIONS

This application is a continuation of U.S. patent application Ser. No. 16/185,983, filed on Nov. 9, 2018, entitled "System and Method for Retail Planning with Smart Product Attributes," which claims the benefit under 35 U.S.C. § 119(e) to U.S. Provisional Application No. 62/724,366, filed Aug. 29, 2018, and entitled "System and Method for Retail Planning with Smart Product Attributes." U.S. patent application Ser. No. 16/185,983 and U.S. Provisional Application No. 62/724,366 are assigned to the assignee of the present application.

TECHNICAL FIELD

The present disclosure relates generally to retail planning and specifically to a system and method of retail planning with smart product attributes.

BACKGROUND

In the retail industry, retailers must launch many new products each season, while coping with changing trends and suppliers. Introducing new products is exceptionally difficult for fashion retailers because the new products have no historical sales data to guide decisions for the buying quantity and the ranging decisions of the new products. Thus, retailers usually use product attributes to describe their new products and infer from those how likely these products could perform based on the performance of products with similar attributes in the past. Selecting the attributes of the new products is complicated by the limitations of retail and assortment planning systems which lack consistency and conventions among supply chain entities and from one season to another. The product data from these entities is therefore disorganized and inconsistent, making it incompatible with planning system user interfaces, which require selection or prediction of product attributes and product attribute values. A typical user interface for one of these systems comprises a simplistic grid view product selector, that gives little or no feedback on selected attributes, and which often generate erroneous descriptions of products in the system. The richness and business insights of merchant planners who select the products are lost, and the system consequently provides less useful results. These drawbacks are undesirable.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 19 illustrates a product model of an uploaded product image generated by the smart attribute product designer of FIG. 8, in accordance with an embodiment.

DETAILED DESCRIPTION

Figure 1:
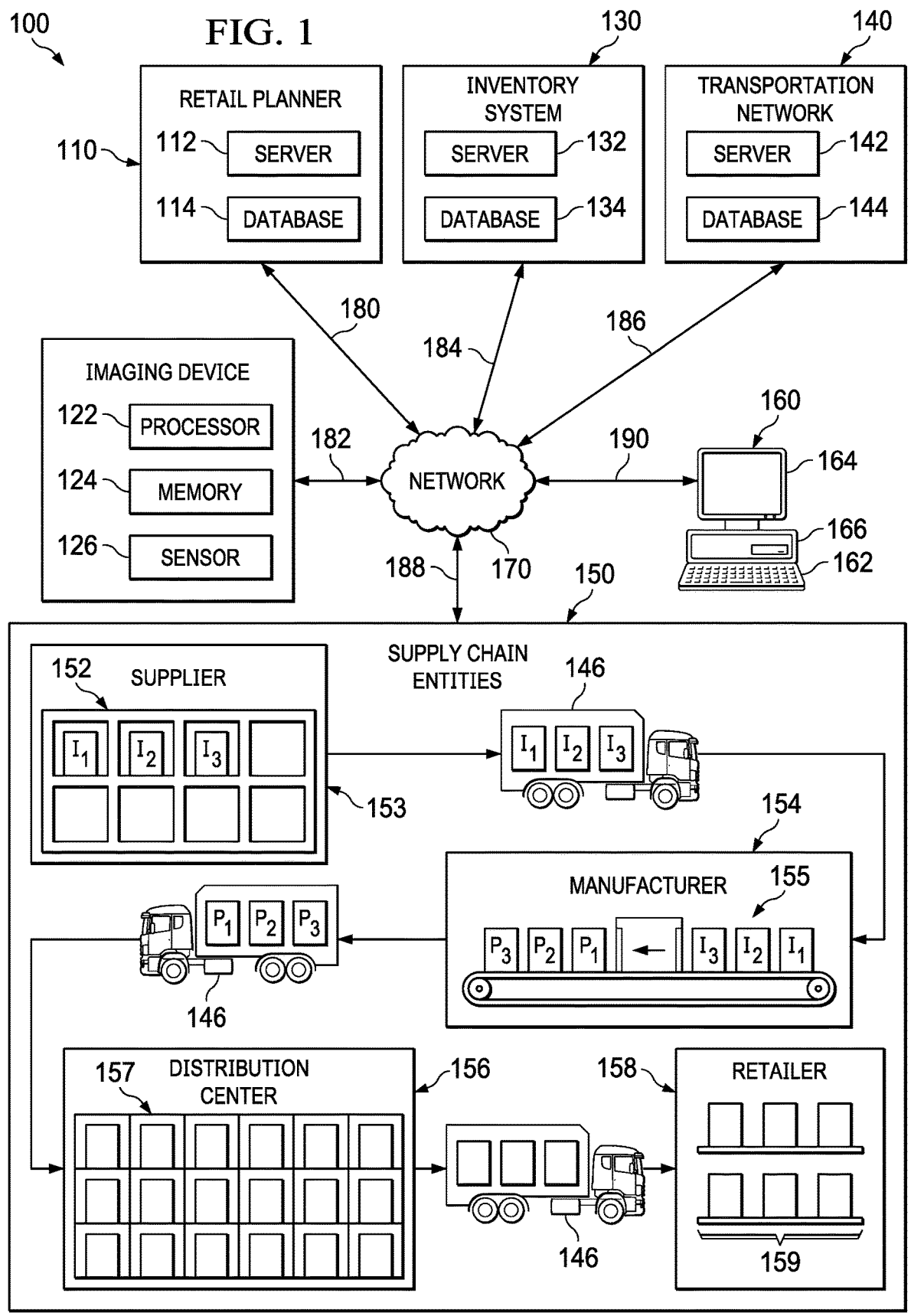
FIG. 1 illustrates an exemplary supply chain network, in accordance with an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

An assortment planning stage during retail planning often involves choosing an assortment of products to sell during a planning period using a data representation model of product attributes to determine transferable demand, regional trends, customer preferences, customer segmentation patterns, product sales, profitability, and the like. However, representing a product by ordinary product attributes is insufficient for an assortment planning system to make these determinations for new products based on the lack of historical data, the low quality of product attribute data, and the limitations of tools for product entry. Taking product entry tools as an example, the range and depth of product attributes and attribute values are limited, which causes products to be frequently represented in an assortment or retail planning systems by often only a combination of a single color, a single product class, and a single brand. In addition, the user interfaces for product entry tools introduce additional errors, including typographical errors and erroneous product descriptions, which severely limits predictions and analysis of the retail planning system, and specifically including machine learning tools, which cannot easily fix these types of errors or make up for the lack of rich insight.

As described in more detail below, embodiments in accordance with the current disclosure create models of retail products using detailed and contextual smart attributes which quantifiably define product features to improve retail planning analysis and predictive insight for retail sales and distribution of new products. Aspects of the disclosed embodiments include a user interface that identifies product attributes and product attribute values and transforms the data representation of the product using smart attributes to improve machine learning predictions and analysis, provide visual feedback for confirmation of correct input of product attributes, and visualizes the relationship between product data inputs and machine learning predictions.

Although embodiments of the system and method are described primarily in connection with a clothing retailer, embodiments are not limited to any particular product or business.

FIG. 1 illustrates exemplary supply chain network 100, in accordance with an embodiment. Supply chain network 100 comprises retail planner 110, one or more imaging devices 120, inventory system 130, transportation network 140, one or more supply chain entities 150, computer 160, network 170, and one or more communication links 180-190. Although a single retail planner 110, one or more imaging devices 120, a single inventory system 130, a single transportation network 140, one or more supply chain entities 150, a single computer 160, and a single network 170, are shown and described, embodiments contemplate any number of retail planners, imaging devices, inventory systems, transportation networks, supply chain entities, computers, or networks, according to particular needs.

In one embodiment, retail planner 110 comprises server 112 and database 114. According to embodiments, server 112 of retail planner 110 generates an interactive user interface for adding, removing, or editing smart product attributes and smart product attribute values for one or more products in a current or planned product assortment. In addition, embodiments of the user interface provide for creating or modifying products for a planned product assortment, displaying images and data for the products, and sorting, organizing and filtering the product images and data by various categories and dimensions, including, for example, product attributes, attribute values, product identification, sales quantity, demand forecast, and the like.

As described more fully below, retail planner 110 relate to assortment and retail planning problems, such as, choosing an assortment of products to sell during a planning period that matches forecasted customer demand. As an example, assortment planning for an exemplary clothing retailer may include choosing an assortment of different clothing products that will match the style, colors, season, and trends predicted to be favored by customers during the planning period and predicting the timing and quantity of orders to meet the actual demand.

In the retail industry, a product, such as clothing, may be defined by one or more attributes, including, for example, color, material, design, pattern, length, and the like. Each attribute may have a different attribute value. These values include, for example, red, blue, green (for color), silk, cotton, polyester (for material), fashion, basic, classic (for design), striped, floral, plaid (for pattern), long, short, high, (for length), and the like. Because a new product often comprises combinations of attributes and attribute values which are not found in previous sales items, forecasting future product demand relies on understanding the relative contribution of available attributes and attribute values to influence purchase decisions. When forecasting product demand in this manner, retail planner 110 identifies one or more products defined by a combination of attributes and attribute values which are forecasted to sell very well, but for which no current product exists. Retail planner 110 may then begin development of a new product with this combination of attributes and attribute values by creating a placeholder in a product assortment for the forecast period and associating the placeholder with the identified combination of attributes and attribute values, including, for example, product category, product class, brand, price band, customer segment, demand forecast, and the like. As described in more detail below, retail planner 110 provides for creating a product based on the placeholder and selecting and editing the product attributes and attribute values using smart attributes and attribute values.

Although examples given below are described primarily in connection with retail and assortment planning of clothing, embodiments may be implemented in systems and tools for product planning and design, product, customer and store segmentation, demand forecasting, and the like. In addition, although particular embodiments are described in connection with a large display device, embodiments of the user interface are configured with particular features suitable for a handheld or small display device. The user interface is designed to be useful in various formats. For example, a one or more imaging devices 120 comprise a user interface for editing and input of product data 212 (FIG. 2) from one or more location local to, or remote from, retail planner 110, such as, for example, input of product attributes and product images during fashion shows, editing of attributes and attributes values, automatic recognition and labeling of attributes of a product from a product image, and the like.

One or more imagining devices 120 comprise one or more processors 122, memory 124, one or more sensors 126, and may include any suitable input device, output device, fixed or removable computer-readable storage media, or the like. According to embodiments, one or more imaging devices 120 comprise an electronic device such as, for example, a mobile handheld electronic device such as, for example, a smartphone, a tablet computer, a wireless communication device, and/or one or more networked electronic devices configured to image items using sensor 126 and transmit product images to one or more databases.

Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information. One or more imaging devices 120 may generate a mapping of one or more items in the supply chain network 100 by scanning an identifier or object associated with an item and identifying the item based, at least in part, on the scan. This may include, for example, a stationary scanner located at one or more supply chain entities 150 that scans items as the items pass near the scanner such as, for example, a point of sale system at one or more retailers that records transaction data and associates the transaction data with product data 222, including, for example, associating customer identity information, store identity and location, market information, time information, price information, discount information, and the like, as described in more detail herein. Embodiments also include, for example, a scanner located at one or more stocking locations of one or more supply chain entities 150 that automatically identifies when an item is received into or removed from the one or more stocking locations.

One or more sensors 126 of one or more imaging devices 120 may comprise an imaging sensor, such as, a camera, scanner, electronic eye, photodiode, charged coupled device (CCD), or any other electronic component that detects visual characteristics (such as color, shape, size, or the like) of objects. In addition, or as an alternative, one or more sensors 126 may comprise a radio receiver and/or transmitter configured to read an electronic tag, such as, for example, an RFID tag. Additionally, one or more sensors 126 of one or more imaging devices 120 may be located at one or more locations local to, or remote from, the one or more imaging devices 120, including, for example, one or more sensors 126 integrated into one or more imaging devices 120 or one or more sensors 126 remotely located from, but communicatively coupled with, one or more imaging devices 120. According to some embodiments, one or more sensors 126 may be configured to communicate directly or indirectly with one or more of retail planner 110, one or more imaging devices 120, inventory system 130, transportation network 140, one or more supply chain entities 150, computer 160, and/or network 170 using one or more communication links 180-190.

Inventory system 130 comprises server 132 and database 134. Server 132 of inventory system 130 is configured to receive and transmit item data, including item identifiers, pricing data, attribute data, inventory levels, and other like data about one or more items at one or more locations in the supply chain network 100. Server 132 stores and retrieves item data from database 134 or from one or more locations in supply chain network 100.

Transportation network 140 comprises server 142 and database 144. According to embodiments, transportation network 140 directs one or more transportation vehicles 146 to ship one or more items between one or more supply chain entities 150, based, at least in part, on a product assortment, an inventory policy, target service levels, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with retail planner 110, one or more imaging devices 120, inventory system 130, transportation network 140, and one or more supply chain entities 150 to identify the location of transportation vehicle 146 and the location of any inventory or shipment located on transportation vehicle 146.

As shown in FIG. 1, supply chain network 100 operates on one or more computers 160 that are integral to or separate from the hardware and/or software that support retail planner 110, one or more imaging devices 120, inventory system 130, transportation network 140, and one or more supply chain entities 150. Supply chain network 100 comprising retail planner 110, one or more imaging devices 120, inventory system 130, transportation network 140, and one or more supply chain entities 150 may operate on one or more computers 160 that are integral to or separate from the hardware and/or software that support retail planner 110, one or more imaging devices 120, inventory system 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from retail planner 110, one or more imaging devices 120, inventory system 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the retail planner 110, one or more imaging devices 120, inventory system 130, transportation network 140, and one or more supply chain entities 150. These one or more users may include, for example, a "merchant" or a "buyer" handling trend identification, assortment planning, and/or one or more related tasks within the system. In addition, or as an alternative, these one or more users within supply chain network 100 may include, for example, one or more computers programmed to autonomously handle, among other things, determining an assortment plan, demand forecasting demand, supply and distribution planning, inventory management, allocation planning, order fulfilment, adjustment of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on one or more product assortments generated by the retail planner 110, selected smart attributes or smart attribute values, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on one or more product assortments generated by the retail planner 110, selected smart attributes or smart attribute values, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more product assortments generated by the retail planner 110, selected smart attributes or smart attribute values, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on one or more product assortments generated by the retail planner 110, selected smart attributes or smart attribute values, and/or one or more other factors described herein.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network is shown and described, embodiments contemplate any configuration of the supply chain network, without departing from the scope described herein.

Although one example of a supply chain network 100 is shown and described, embodiments contemplate any configuration of supply chain network 100, without departing from the scope described herein.

In one embodiment, retail planner 110 may be coupled with network 170 using communications link 180, which may be any wireline, wireless, or other link suitable to support data communications between retail planner 110 and network 170 during operation of supply chain network 100. Imaging devise 120 may be coupled with network 170 using communications link 182, which may be any wireline, wireless, or other link suitable to support data communications between imaging devices 120 and network 170 during operation of supply chain network 100. Inventory system 130 may be coupled with network 170 using communications link 184, which may be any wireline, wireless, or other link suitable to support data communications between inventory system 130 and network 170 during operation of supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling retail planner 110, one or more imaging devices 120, inventory system 130, transportation network 140, one or more supply chain entities 150, and computer 160 to network 170, any of retail planner 110, one or more imaging devices 120, inventory system 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling retail planner 110, one or more imaging devices 120, inventory system 130, transportation network 140, and one or more supply chain entities 150, and computer 160. For example, data may be maintained locally to, or externally of, retail planner 110, one or more imaging devices 120, inventory system 130, transportation network 140, and one or more supply chain entities 150, and computer 160 and made available to one or more associated users of retail planner 110, one or more imaging devices 120, inventory system 130, transportation network 140, and one or more supply chain entities 150, and computer 160 using network 170 or in any other appropriate manner. For example, data may be maintained in a cloud database at one or more locations external to retail planner 110, one or more imaging devices 120, inventory system 130, transportation network 140, and one or more supply chain entities 150, and computer 160 and made available to one or more associated users of retail planner 110, one or more imaging devices 120, inventory system 130, transportation network 140, and one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

One or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more product assortments created in retail planner 110, current inventory or production levels, and/or one or more other factors described herein, and/or. Inventory data 228 may comprise current or projected inventory quantities or states, the current level of inventory for products at one or more stocking points across the supply chain network 100, order rules that describe one or more rules or limits on setting an inventory policy, including, but not limited to, a minimum order quantity, a maximum order quantity, a discount, a step-size order quantity, and batch quantity rules. According to some embodiments, retail planner 110 accesses and stores inventory data 228 in database 114, which may be used by retail planner 110 to place orders, set inventory levels at one or more stocking points, initiate manufacturing of one or more products, or the like. In addition, or as an alternative, inventory data 228 may be updated by receiving current item quantities, mappings, or locations from the one or more imaging devices 120, inventory system 130, and/or transportation network 140.

The methods described herein may include computers 160 receiving product data 222 (FIG. 2) from automated machinery having at least one sensor and product data 222 corresponding to an item detected by the automated machinery. The received product data 222 may include an image of the item, an identifier, as described above, and/or other product information associated with the item (dimensions, texture, estimated weight, and the like).

For example, embodiments contemplate identifying products, product attributes, and/or attribute values from freehand drawings using machine learning algorithms. In addition to freehand drawings, embodiments contemplate identifying products, product attributes, and/or attribute values from uploaded product images using machine learning algorithms. The identified products, product attributes, and/or attribute values may be used by retail planner 110 to generate one or more templates or initial product attribute and attribute value selections. In addition, embodiments contemplate using one or more images to create new products based on the combination of images of particular patterns, designs, or previous products. New styles may be created by recombining attributes from existing styles and/or mutating the existing styles or attribute values to create new products. In addition, embodiments contemplate creating products based on surveys of customers to identify features based on the personality and interests of customers. For example, based on customer selections of particular answers to personality and other survey questions, the retail planner may automatically identify or create products having attributes and attribute values that are likely to be purchased by those customers.

The method may further include computers 160 looking up the received product data 222 in a database system associated with retail planner 110 to identify the item corresponding to the product data 222 received from the automated machinery. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate items to add to or remove from an inventory of or shipment for one or more supply chain entities. In addition, or as an alternative, retail planner 110 monitors the supply chain constraints of one or more items at one or more supply chain entities and adjusts the orders and/or inventory of the one or more supply chain entities based on the supply chain constraints.

Figure 2:
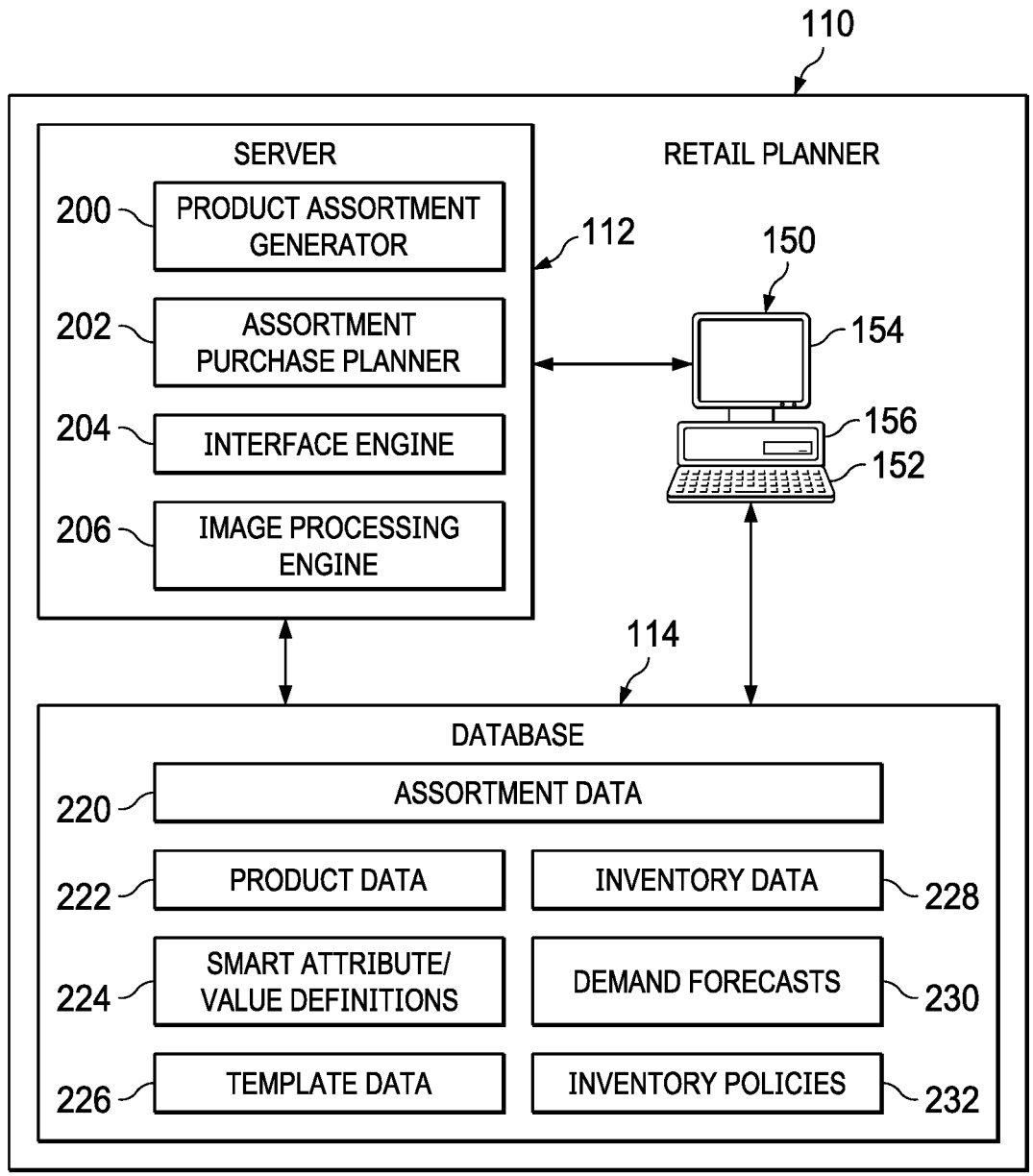
FIG. 2 illustrates the retail planner of FIG. 1 in greater detail, in accordance with an embodiment.

FIG. 2 illustrates retail planner 110 of FIG. 1 in greater detail, in accordance with an embodiment. As discussed above, retail planner 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, retail planner 110 comprises server 112 and database 114. Although retail planner 110 is shown as comprising a single computer 160, a single server 112, and a single database 114, embodiments contemplate any suitable number of computers, servers, or databases internal to or externally coupled with retail planner 110. According to some embodiments, retail planner 110 may be located internal to one or more retailers 158 of one or more supply chain entities 150. In other embodiments, retail planner 110 may be located external to one or more retailers 158 of one or more supply chain entities 150 and may be located in, for example, a corporate office or headquarters of the one or more retailers 158, according to particular needs.

Server 112 of retail planner 110 may comprise product assortment generator 200, assortment purchase planner 202, interface engine 204, and image processing engine 206. Although server 112 is shown and described as comprising a single product assortment generator 200, a single assortment purchase planner 202, a single interface engine 204, and a single image processing engine 206, embodiments contemplate any suitable number or combination of these located at one or more locations, local to, or remote from retail planner 110, such as on multiple servers or computers at any location in supply chain network 100.

Database 114 of retail planner 110 may comprise one or more databases or other data storage arrangement at one or more locations, local to, or remote from, server 112. Database 114 comprises, for example, assortment data 220, product data 222, smart attributes and smart attribute values definitions 224, templates 226, inventory data 228, demand forecasts 230, and inventory policies 232. Although, database 114 is shown and described as comprising assortment data 220, product data 222, smart attributes and smart attribute values definitions 224, templates 226, inventory data 228, demand forecasts 230, and inventory policies 232, embodiments contemplate any suitable number or combination of these, located at one or more locations, local to, or remote from, retail planner 110 according to particular needs.

Product assortment generator 200 of retail planner 112 generates product assortment by selecting the products that will be included or excluded in a product assortment for a particular planning period. The product assortment may be based on, for example, data regarding sales, profitability, transferable demand, similarity, or the like for any one or more products or assortments.

Assortment purchase planner 202 of retail planner 112 may calculate a purchase quantity of items in an assortment and place an order based on, for example, a new product assortment. In addition, or as an alternative, assortment purchase planner 202 monitors the inventory of one or more items and adjusts product mix ratios, inventory levels at various stocking points, production of products of manufacturing equipment, proportional or alternative sourcing of one or more supply chain entities 150, and the configuration and quantity of packaging and shipping of products based, at least in part, the inventory levels or inventory policies and the products selected for a current or future product assortment.

Interface engine 204 of retail planner 110 generates a user interface that provides for locating, filtering and sorting products using filtering controls and one or more attributes and selecting products for inclusion in a product assortment. In addition, interface engine 204 provides for input, selection, and editing of products, product attributes, and attribute values. For example, as described in more detail below, embodiments of interface engine 204 generate a user interface providing for input and editing of attributes and attribute values and smart attributes and smart attribute values of a product selected from one or more templates, drawn freehand on a virtual canvas, or identified from a product image. Interface engine 204 of retail planner 110 does not require any particular input of a product or a product template, but instead provides one or more tools to transform a product input by applying smart attributes to create contextual features that identify products by, for example, the location of particular patterns, color variations, or the like. For example, a product may comprise one or more primary colors and one or more secondary colors. By using smart product attributes, retail planner 110 can store contextualized information identifying, for example, what proportion of a product is made of one or more colors, the locations of particular features (such as different colored stripes), and the like. In addition, interface engine 204 displays a visual representation of an input that is received by the machine learning system, which provides a user with understanding of correlations between the input of the machine learning system and the output. For example, a user may not intuitively understand the correlation between an attribute or particular attribute values that may be selected for a product. However, as described in more detail below, interface engine 204 displays a visual element that corresponds directly with the smart attribute values input into a machine learning system for each product. This provides visual confirmation that an attribute of a product matches the selected product attribute value.

Image processing engine 206 may identify a product or product features from a product image using, for example, using machine learning algorithms. As described in more detail below, image processing engine 208 receives one or more product images from interface engine 204 and is tasked with identifying a product or one or more features of the product in the image. Based on the features or product identified in the image, image processing engine 206 may suggest a product template with attributes and attribute values corresponding to one or more of the identified product features. In addition, image processing engine 206 may train a machine learning model to improve product template suggestion and product and product feature identification by scoring which of the one or more recommended product templates suggested by image processing engine 206 is selected. The image processing engine 206 may train the machine learning model to improve future recommendations using the product image and which product template is selected by a user. In addition, image processing engine 206 may identify product features of a product in the product assortment based on the image associated with the product and indicate when the attribute values of the product do not match the features in the product image. However, many attributes cannot be easily or consistently detected from images of products (including, for example, fabric, price, silhouette, newly-created attributes, etc.). In addition, product images of newly-created products are often unavailable.

The various types of data stored in the database of retail planner 110 will now be discussed.

Assortment data 220 of database 114 comprises the identity of products selected for an assortment and the attributes associated with those products. According to embodiments, assortment data 220 comprises the identity and attributes of products selected for one or more future, current, or past time periods. In addition, assortment data 220 may comprise one or more placeholders to represent a vacancy in a product assortment. The placeholder may be associated with particular attributes that would be desired for a product in that assortment and based on, for example, a forecasted demand.

Product data 222 of the database may comprise products identified by, for example, a product identifier (such as a Stock Keeping Unit (SKU), Universal Product Code (UPC) or the like), and one or more attributes and attribute types associated with the product ID. Product data 222 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Traditional attributes and attribute values often cause predictions and interpretations of product inputs to be erroneous. In particular, traditional attributes and attribute values lack consistency and conventions among one or more supply chain entities 150 and from one fashion season to another. For example, when analyzing an attribute for "length" for a single retailer 158 of a supply chain network 100, a typical retailer 158 may use "length" to refer to lengths of dresses, sleeves, skirts, straps, or the like. Additionally, often several attribute values will refer to the same characteristic of a product, or one attribute value may refer to several different features of products. For example, continuing with the exemplary "length" attribute, attribute values of 'knee,' 'knee-length,' 'knee length dress,' and 'knee length skirt 65-72 cm,' although different in appearance, refer to the same characteristic of the underlying product.

To further illustrate the drawbacks of traditional attributes and attribute value representations of product features, an additional example is now given in connection with color attributes. Color attributes for clothing cannot be easily represented by attributes and attribute values. For example, clothing ordinarily comprises more than one color and different colors on different areas of the clothing. Attribute values for color attributes often have multiple color values in a single field, separated by, for example, a slash mark between the multiple color values. Storing color data with this data structure does not accurately indicate the proportional coloration of a product or the placement of those colors on different areas of the products.

Smart attributes and smart attribute value definitions 224 comprise quantifiable and objective mappings of product features having consistent conventions between supply chain entities and over multiple time periods. According to embodiments, smart attributes are quantifiable to assess closeness of attributes, such as, for example, colors (expressed by RGB values, unique color codes, etc.), lengths (in particular measurements of inches, feet, centimeters, etc.) and other like attributes. In addition, smart attributes comprise richness, including, for example, representing contextual attribute information such as, for example, the locations of colors and patterns on products. In addition, smart attributes map new trends and vocabulary to historical data using stable and enduring attribute identification, which improves machine learning and analytics and allows trends from different time periods to be directly compared.

By using quantifiable smart attributes, attribute value closeness may be analyzed. For example, a clothing retailer may use smart attributes to express sleeve length using smart attribute values that are linked to quantifiable measurements (such as a length, expressed in, for example, inches). Using the smart attributes for sleeve length, the system may determine that sleeveless is closer to short-sleeved than it is to long-sleeved. Using smart attributes for colors, the system may determine that a particular light blue is closer to another blue than it is to pink. According to embodiments, smart attributes are defined by a set of experts for a product category.

By way of example, and not of limitation, sleeve length of a clothing product may be defined using a numerical range that correlates to particular smart product attribute labels. Continuing with this example, the smart attribute would be sleeve length, and the smart attribute values would be numerical values representing ranges for sleeve lengths that are defined by particular sleeve length labels. For example, a sleeve length of zero inches is defined as sleeveless, a sleeve length between 0 and 5 inches is defined as short sleeves, and a sleeve length between 5 and 10 inches is defined as elbow. Although particular ranges of inches are indicated as defining particular sleeve lengths, embodiments contemplate any product attribute defined by particular product attribute values. For example, the labels defining a product attribute may be changed, the rules to fix which values respond to which labels may be changed as well, but the important aspect is that every label matches the value behind the scenes which makes the label easy to understand for the algorithm. This eliminates attribute value labels that are meaningless or that do not correlate across various products or product attributes. Instead the system uses the smart attributes and smart attribute values to understand the labels by numerical values that can be analyzed and understood.

By way of a further example, richness of the smart product attributes provides for representing the product features with contextualized information identifying, for example, the location of particular patterns, color variations, or the like. Continuing with the exemplary clothing retailer, a dress may comprise one or more primary colors and one or more secondary colors. By using smart product attributes, retail planner 110 stores contextualized information identifying, for example, what proportion of a product is made of one or more colors, the locations of particular features (such as different colored stripes), and the like. Using the visual representation of the smart attributes on a virtual canvas, as described in more detail below, such as the location of different colors/patterns on a product, smart attributes may comprise analyzing various mixes of pixels that compose the product. Predefined regions of a retail product, such as chest, waist, thigh, knee, calf, ankle, sleeves, and the like, could be defined such that colors/patterns distribution are aggregated by region of the clothing. Embodiments contemplate a library of pattern templates to represent pattern attributes, as well as importation of new patterns. Similarity between patterns may then be analyzed by measuring the similarity between pattern templates with traditional techniques such as convolutional neural networks.

In addition, the long-lasting mappings of the smart product attributes may comprise quantifiable and objective definitions that allow trends from different time periods to be directly compared. Continuing with the exemplary clothing retailer, trends for clothing, such as pant styles, change often over time. However, using the attributes only make sense in the particular time period they were used and will provide little future predictive power to future products. If the best performing product from twenty years ago was introduced today, it would likely be a poor performing product. When attributes are too subjective, the trends for new products are obscured. By using objective smart attributers, the particular qualities of trends over many years may be quantified and analyzed, which provides richer data that may be used during much later planning periods.

Templates 226 comprise predefined templates of products, associated with one or more predefined smart attributes and attribute values, according to an embodiment. The number, types, attributes, and initial attribute values of product templates presented may be preselected and defined based on input from merchants, retail planners 110, and experts. In addition, attributes for a product may automatically contextualized to the class of a product.

Inventory data 228 of database 114 may comprise any data relating to current or projected inventory quantities or states, order rules, or the like. For example, inventory data 228 may comprise the current level of inventory for each item at one or more stocking points across supply chain network 100. In addition, inventory data 228 may comprise order rules that describe one or more rules or limits on setting an inventory policy, including, but not limited to, a minimum order quantity, a maximum order quantity, a discount, and a step-size order quantity, and batch quantity rules. According to some embodiments, retail planner 110 accesses and stores inventory data 228 in database 114, which may be used by retail planner 110 to place orders, set inventory levels at one or more stocking points, initiate manufacturing of one or more components, or the like. In addition, or as an alternative, inventory data 228 may be updated by receiving current item quantities, mappings, or locations from inventory system 130 and/or transportation system 140.

Demand forecasts 230 of database 114 may indicate future expected demand based on, for example, any data relating to past sales, past demand, purchase data, promotions, events, or the like of one or more supply chain entities 150. Demand forecasts 230 may cover a time interval such as, for example, by the minute, hour, daily, weekly, monthly, quarterly, yearly, or any suitable time interval, including substantially in real time.

Inventory policies 232 of database 114 may comprise any suitable inventory policy describing the reorder point and target quantity, or other inventory policy parameters that set rules for retail planner 110 to manage and reorder inventory. Inventory policies 232 may be based on target service level, demand, cost, fill rate, or the like. According to embodiment, inventory policies 232 comprise target service levels that ensure that a service level of one or more supply chain entities 150 is met with a certain probability. For example, one or more supply chain entities 150 may set a service level at 95%, meaning supply chain entities 150 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, retail planner 110 may determine a replenishment order according to one or more replenishment rules, which, among other things, indicates to one or more supply chain entities 150 to determine or receive inventory to replace the depleted inventory.

Figure 3:
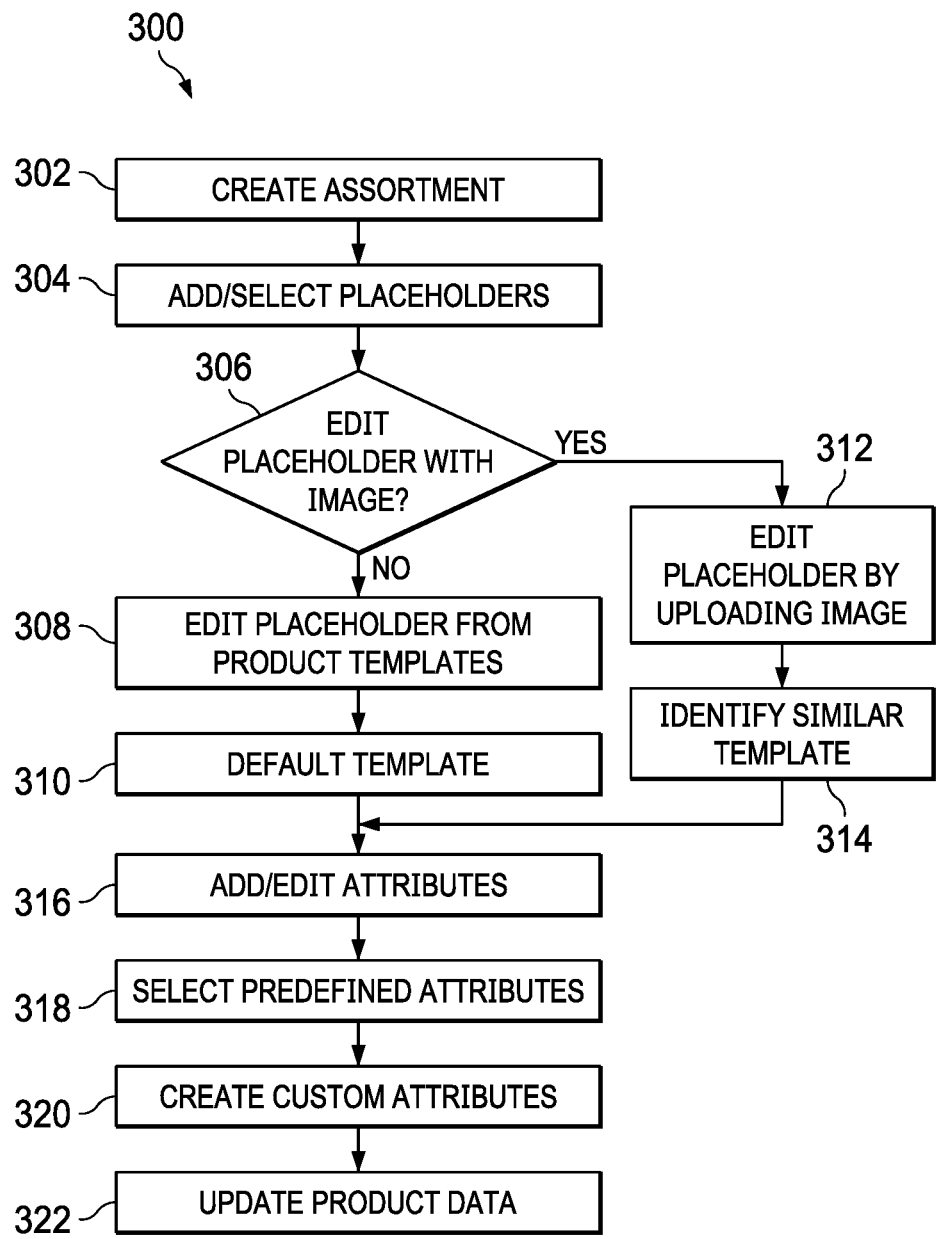
FIG. 3 illustrates an exemplary method of assortment planning using smart product attributes, in accordance with an embodiment.

FIG. 3 illustrates exemplary method 300 of assortment planning using smart product attributes, in accordance with an embodiment. Although actions of method 900 are described in a particular order, embodiments contemplate actions of method 300 performed in any suitable order or combination according to particular needs.

At action 302, product assortment generator 200 creates a product assortment comprising a selection of products to sell during a selected time period based on sales, profitability, transferable demand, similarity, or the like. According to some embodiments, retailers 158 select one or more products sold by suppliers 152 and create and store a data representation of the product in retail planner 110. In addition, or in the alternative, retailers 158 design a product using smart attributes and requires suppliers 152 to supply a product that matches the data representation created by the retailer.

At action 304, interface engine 204 displays a user interface for adding a placeholder to or selecting a placeholder from a product assortment. Interface engine 204 displays a selection of one or more products in an upcoming product assortment represented by user-selectable interactive elements comprising an image of one or more products. In response to selection of the one or more interactive elements representing the products, interface engine 204 provides viewing product information or modifying the attributes or attributes values of the one or more products. However, when no product matches selected features for an upcoming product assortment, product assortment generator 200 creates a placeholder and interface engine 204 displays a placeholder element comprising a user-selectable interactive element. According to some embodiments, user-selectable interactive elements, such as placeholder elements, comprise interactive display regions of a GUI that are selectable by, for example, clicking on or hovering over the display region displaying the one or more interactive elements using a mouse, touchscreen, or other input device. When a placeholder is selected, smart attributes interface engine 202 initiates an interactive user interface for creating a new product using one or more smart attributes and smart attribute values.

At action 306, interface engine 204 provides an interactive user interface for editing the placeholder to create a new product using an image of the product. According to embodiments, in response to and at least partially based on selection of a placeholder, interface engine 204 displays user-selectable interactive elements for creating a new product from the selected placeholder by either selecting a product template or by identifying features from a product image. In addition, embodiments contemplate providing user-selectable interactive elements for creating a new product from a placeholder by selecting one or more initial attributes of the product.

When the placeholder is edited without uploading a product image, method 300 proceeds to action 308, but when the placeholder is edited from a product image, method 300 proceeds to 312.

At action 308, interface engine 204 provides identifies one or more product templates associated with the product and one or more attribute or attribute values, associated with the placeholder.

At action 310, interface engine 204 retrieves and renders for display one or more product templates representing initial attributes and attribute values for a product. According to embodiments, interface engine 204 displays one or more user-selectable interactive elements for selecting a product template from a set of predefined product templates that represent various configuration of a product and which may be edited to produce a smart attributes model of the product. In addition, instead of directly selecting a product template, embodiments of retail planner 110 provide for selecting a product template automatically based on a product image.

Returning to action 306, when the placeholder is edited by uploading a product image method 300 proceeds to action 312. At action 312, interface engine 204 renders and displays an interactive element for uploading a product image to the interface engine 204. According to embodiments, interface engine 204 transfers the uploaded image to image processing engine 208 to identify one or more features of the product in the image, using, for example, machine learning algorithms.

At action 314, interface engine 204 receives the identified features from image processing engine 208 and renders for display one or more product templates having attributes and attribute values that correspond to the identified features of the uploaded product image. According to embodiments, interface engine 204 displays one or more user-selectable interactive elements for selecting one or more product templates from a set of predefined product templates that represent configurations of a product based on the uploaded product image and which may be edited to produce a smart attributes model of the uploaded image product. In addition, the model of the uploaded image product may be further modified to create a new product based on the features of the uploaded image product. Although interface engine 204 displays one or more recommended product templates, embodiments contemplate providing an option to display all templates and select any one or more additional templates or product images which the user believes are better representations of the uploaded image. Additional embodiments contemplate interface engine 204 records the selected product template from the displayed set of product templates, which may be used with machine learning techniques to score the how well the recommended product templates match the uploaded product image, and train the machine learning model to improve future recommendations.

At action 316, interface engine 204 detects the selected product template from action 310 or action 314, and, in response, renders and displays a virtual canvas and user interface for viewing, selecting, and editing smart attributes and smart attribute values for a product based on the selected product template. In addition, embodiments contemplate interface engine 204 detects one or more selected product attributes or attribute values for a new product, and, in response, renders and displays a virtual canvas and user interface for viewing, selecting, and editing smart attributes and smart attribute values for a product based on the one or more selected product attributes or attribute values.

According to some embodiments, interface engine 204 renders and displays one or more user-selectable interactive elements for adding, deleting, or modifying one or more smart attributes and smart attribute values. In response to and at least partially based on selecting, adding, deleting, or modifying one or more smart attributes and smart attribute values, interface engine 204 updates assortment data 220, product data 222, smart attributes and smart attribute values definitions 224, and/or templates 226.

At action 318, interface engine 204 renders and displays one or more user-selectable interactive elements for selecting one or more predefined smart attributes and smart attribute values. According to embodiments, interface engine 204 renders and displays one or more user-selectable interactive elements for adding one or more attributes to the product displayed on the virtual canvas. As described in more detail below, interface engine 204 represents the approximate location and identity of product attributes with user-selectable interactive elements displayed over the product image and which, when selected, displays an information popup that indicates the identity of the attribute and/or attribute value represented by the user-selectable interactive elements. When adding one or more attributes to the product, interface engine 204 may render a new user-selectable interactive element, which is then displayed over the displayed product. In addition, interface engine 204 may suggest default initial attribute values. The default initial attribute values may be based, for example, on the selected product template, the product category or class, one or more product features or attributes associated with the placeholder or product assortment, or the like.

At action 320, interface engine 204 renders and displays one or more user-selectable interactive elements for creating one or more custom smart attributes and smart attribute values. According to embodiments, interface engine 204 renders and displays one or more user-selectable interactive elements for creating one or more custom attributes for the product displayed on the virtual canvas. For example, in response to and based at least partially on selection of one or more user-selectable interactive elements representing the attributes of the product, interface engine 204 renders and displays one or more interactive elements for modifying the selected attribute. The selected attribute may be modified by, for example, selecting a boundary or surface of the displayed product and altering the size, dimensions, orientation, coloring, pattern, or other like attributes using one or more editing tools, such as, for example, a cropping tool, a brush tool, dragging and dropping different elements, selecting customized colors from a color selection tool, directly editing the alphanumeric value of a displayed element, and the like. Although particular attributes and attribute values are described as being modified by particular tools, embodiments contemplate creating custom attributes and attribute values for any product feature using other suitable graphic interface editing tools.

At action 322, interface engine 204 renders and displays one or more user-selectable interactive elements for saving or cancelling the product with the attributes and attribute values currently displayed on the virtual canvas. In response to and based partially on selection of a cancelling element, interface engine 204 discards and/or does not save the attributes and attribute values for the displayed product. In response to and based partially on selection of a save element, interface engine 204 saves and stores the smart attributes and smart attribute values as product data 222.

By way of further explanation of method 300, an example is now given in connection with planning a product assortment using smart attributes for an exemplary clothing retailer. In the following example, exemplary clothing retailer plans a product assortment for a product comprising a dress. As described in more detail below, a retail product comprising a dress may be described by one or more attributes including, for example, neck type, fabric, pattern, color, and the like. Embodiments of retail planner 110 comprise a user interface providing for automatically correcting erroneous or inconsistent product attributes and attribute values, choosing a dress from a set of product templates comprising pre-defined silhouettes, representing selectable attributes using one or more interactive elements that are represented a product visualization of a virtual canvas. As described in detail below, the virtual canvas provides for editing and customizing attributes of the dress, such as, for example, selecting the dress length and the dress sleeve length by selecting pre-defined and standardized attribute values or selecting custom lengths using a slideable icon. In addition, embodiments of retail planner 110 described in more detail below provide for selecting dress color attributes from a palette, wherein color identifier (such as, for example, name, hex code, and the like) is selected or automatically generated. In addition, virtual canvas provides adding one or more colors to the dress visualization, and automatically determining a percentage of the dress covered by each color and displaying a color family identified. As described in more detail below, embodiments provide for customizing product attributes by modifying dress visualization on virtual canvas using a drawing tool, suggesting predefined silhouettes based on uploaded product images, and editing dress visualization created on the virtual canvas from the uploaded image.

Figure 4:
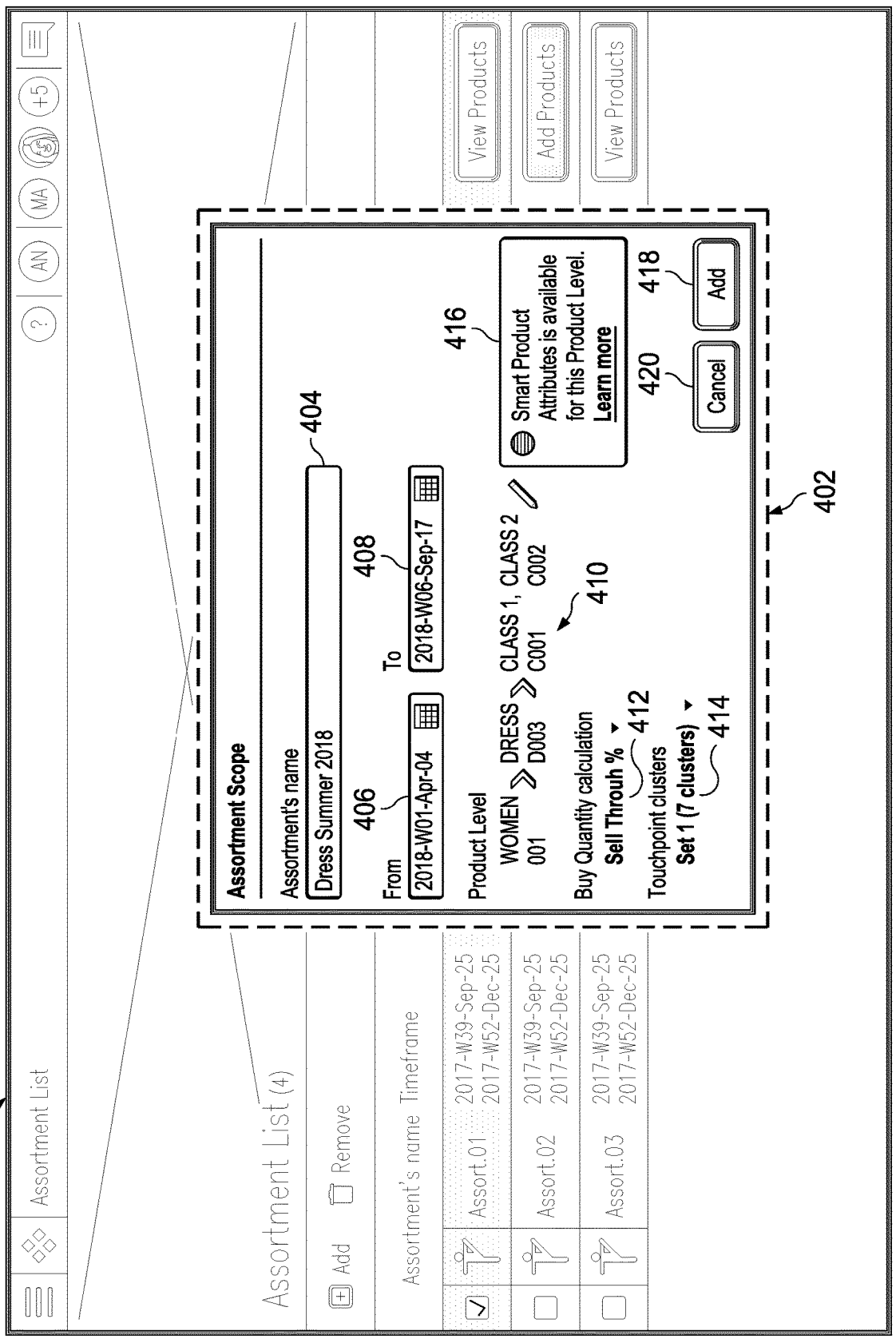
FIG. 4 illustrates assortment creation by an assortment planning user interface, in accordance with an embodiment.

FIG. 4 illustrates assortment creation by assortment planning user interface 400, in accordance with an embodiment. Assortment planning user interface 400 comprises assortment scope popup box 402 comprising one or more interactive elements to edit or select assortment name 404, assortment start date 406, assortment end date 408, product level 410, buy quantity 412, and touchpoint clusters 414. According to embodiments, product assortment generator 200 creates a product assortment between the selected assortment start date 406 and the selected assortment end date 408 for a group of products selected according to product level 410. Product level 410 comprises the hierarchical level of products attributes for which the product assortment is generated. According to embodiments, retail planner 110 generates a product assortment at product level 410 comprising the product category level. Product category level indicates a level in a product hierarchy under which all products are described by the same attributes and are perceived as being substitutable. Product category levels in the clothing retail industry may include, for example, women's dresses, men's pants, women's shoes, men's shoes, and the like. According to embodiments, product category levels for the retail industry may be more or less specific categories of products, depending on particular needs. Additionally, retail planner 110 may generate a product assortment for a particular season. Fashion retail products often comprise two seasons: a spring/summer season and a fall/winter season. According to embodiments, retail planner 110 selects a product assortment for a particular product category for a particular season, such as, for example, women's dresses, in Class 1 and Class 2, for a spring/summer season of 2018. Although a particular product category and season are described, embodiments contemplate a product assortment for any one or more product categories and one or more time periods, according to particular needs.

When the group of products selected according to product level 410 comprise product attributes defined by smart product attribute, assortment planning user interface 400 displays smart product attributes notification 416. For smart attributes to be available for a product category, a team of experts (retail planners, merchants, and/or data experts from one or more retailers) may work together to define conventions and objective definitions of product attributes and product attribute values. For example, to create smart product attributes for the exemplary dress product described herein, attributes and attribute values for the dress are defined as smart attributes. Smart attributes are defined for similar products across many different retailers and supply chain entities so that products are consistently described now and in future product assortments. When smart product attributes are not available, assortment planning user interface 400 provides for manual entry of product attributes.

After selection of product assortment settings selected on assortment scope popup 402, one or more placeholders or products may be added to the product assortment by selection of add button 418. However, upon selection of cancel button 420, assortment planning user interface 400 discards selection of product assortment settings, and closes assortment scope popup 402.

Figure 5:
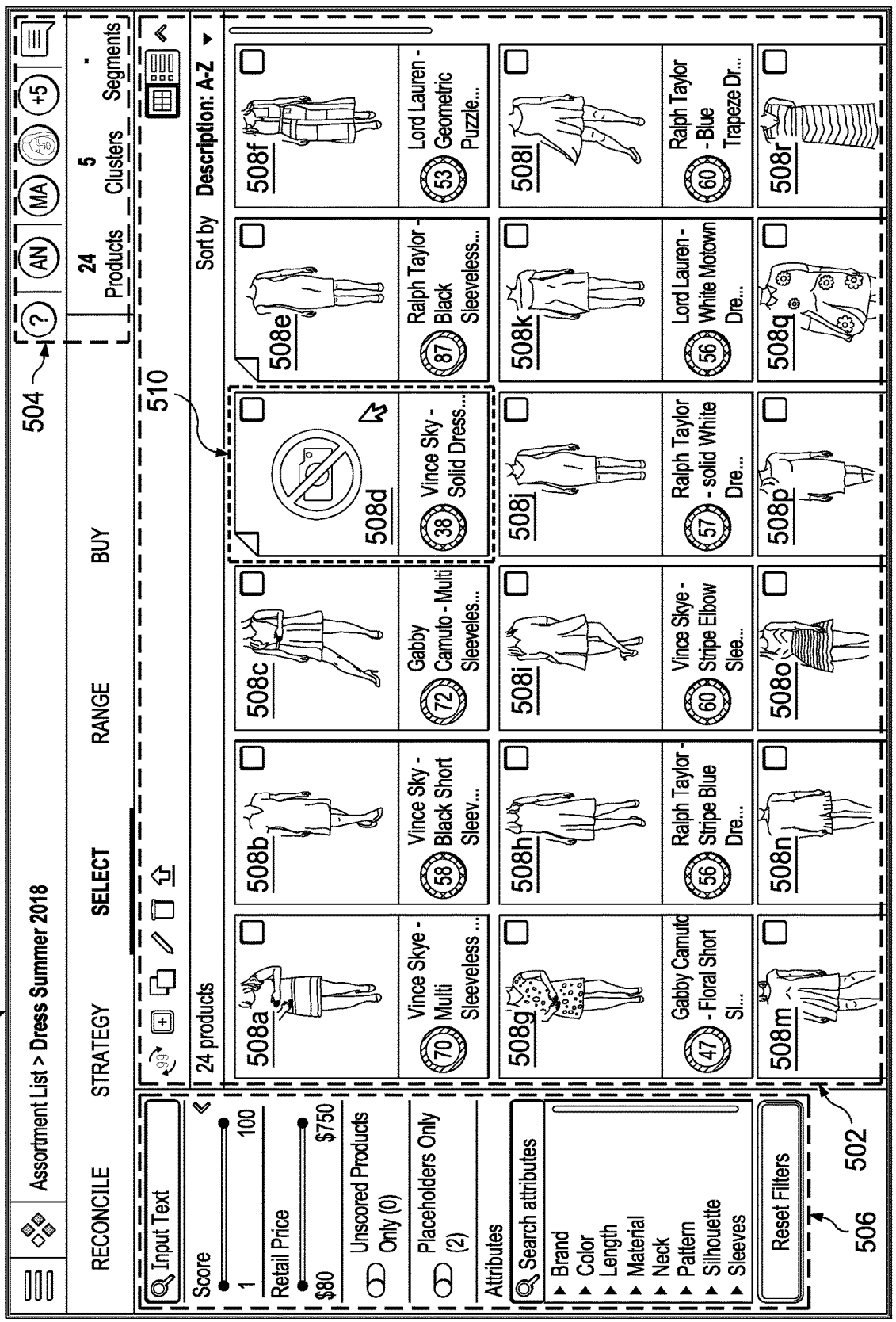
FIG. 5 illustrates an assortment planning dashboard, in accordance with an embodiment.

FIG. 5 illustrates assortment planning dashboard 500, in accordance with an embodiment. Assortment planning dashboard 500 comprises one or more interactive elements for selecting and scoring products for inclusion in a product assortment. Assortment planning dashboard 500 comprises product assortment selection 502, notification panel 504, filter 506, and product cards 508a-508r. Continuing with the exemplary dress retail product, product assortment selection 502 displays one or more products that are located for inclusion in a product assortment. Notification panel 504 of assortment planning dashboard 500 indicates that twenty-four products are displayed and being selected for five store clusters. Filter 506 provides for filtering and sorting using one or more attributes, such as, for example, brand, color, length, material, neck, pattern, silhouette, sleeves, and the like. Although particular attributes are illustrated, embodiments contemplate searching and filtering products based on any combination of suitable attributes.

Product assortment selection 502 comprises product cards 508a-508r, each product card 508 comprising a product image, an identification number, and a score, except for product card 508d, which represents a placeholder.

As described above, assortment planning interface 400 provides for selection of one or more product assortment settings to identify a product in an upcoming season with particular features. However, when no product is located for an upcoming season that matches the selected features, product assortment generator 200 creates a product placeholder. In the illustrated embodiment, the product placeholder is represented by a product placeholder element 510 comprising a camera graphic with a circle and line crossing it, indicating that no image is available for the product represented by product placeholder element 510, interface engine 204 provides an interactive user interface for editing product placeholder element 510 to create a new product for the product card 508d.

Figure 6:
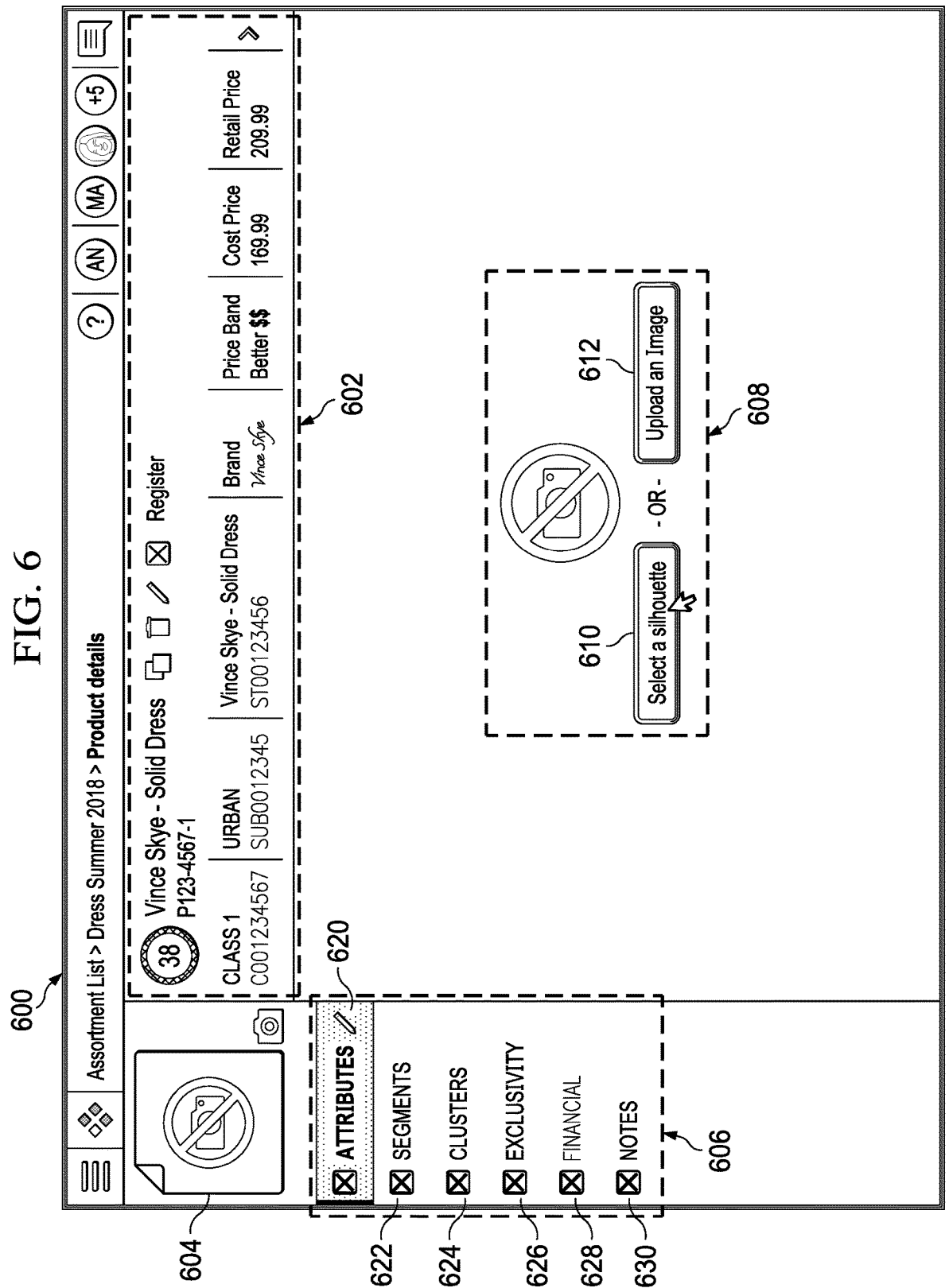
FIG. 6 illustrates a product design interface, in accordance with an embodiment.

FIG. 6 illustrates product design interface 600, in accordance with an embodiment. Product design interface 600 comprises product toolbar 602, product image display area 604, product details sidebar 606, and placeholder edit selection 608.

Product toolbar 602 of product design interface 600 displays product placeholder information, including, for example, product name, product class, product style, brand, price band, cost price, retail price, and the like. Product image display area 604, as described in more detail below, displays a product image or a product visualization to provide visual confirmation of selected product attribute values, as described in more detail herein. Product details sidebar 606, in response to and at least partially based on selection of one or more user-selectable elements, displays one or more of product attributes 620, customer segment 622, clusters 624, exclusivity 626, financials 628, and notes 630.

According to embodiments placeholder edit selection 608, in response to and at least partially based on selection of product placeholder element 510, displays user-selectable interactive elements for creating a new product from the selected placeholder by either selecting product template selection button 610 or product image features identification button 612. For example, and continuing with the exemplary dress retail product, the product placeholder may be edited to create a dress for the summer 2018 product assortment by selecting product template selection button 610 ("select a silhouette"). In response to and at least partially based on a user selection of product template selection button 610, product design interface 600 displays one or more interactive elements for configuring or designing a product, including, for example, selection of one or more smart product attributes and smart attribute values. In addition, or in the alternative, in response to and at least partially based on selection of product image features identification button 612, product design interface 600 displays one or more interactive elements uploading a product image. In addition, embodiments contemplate providing user-selectable interactive elements for creating a new product from a placeholder by selecting one or more initial attributes of the product. By way of description and not of limitation, editing the product placeholder in response to selection of product template selection button 610 will now be described.

Figure 7:
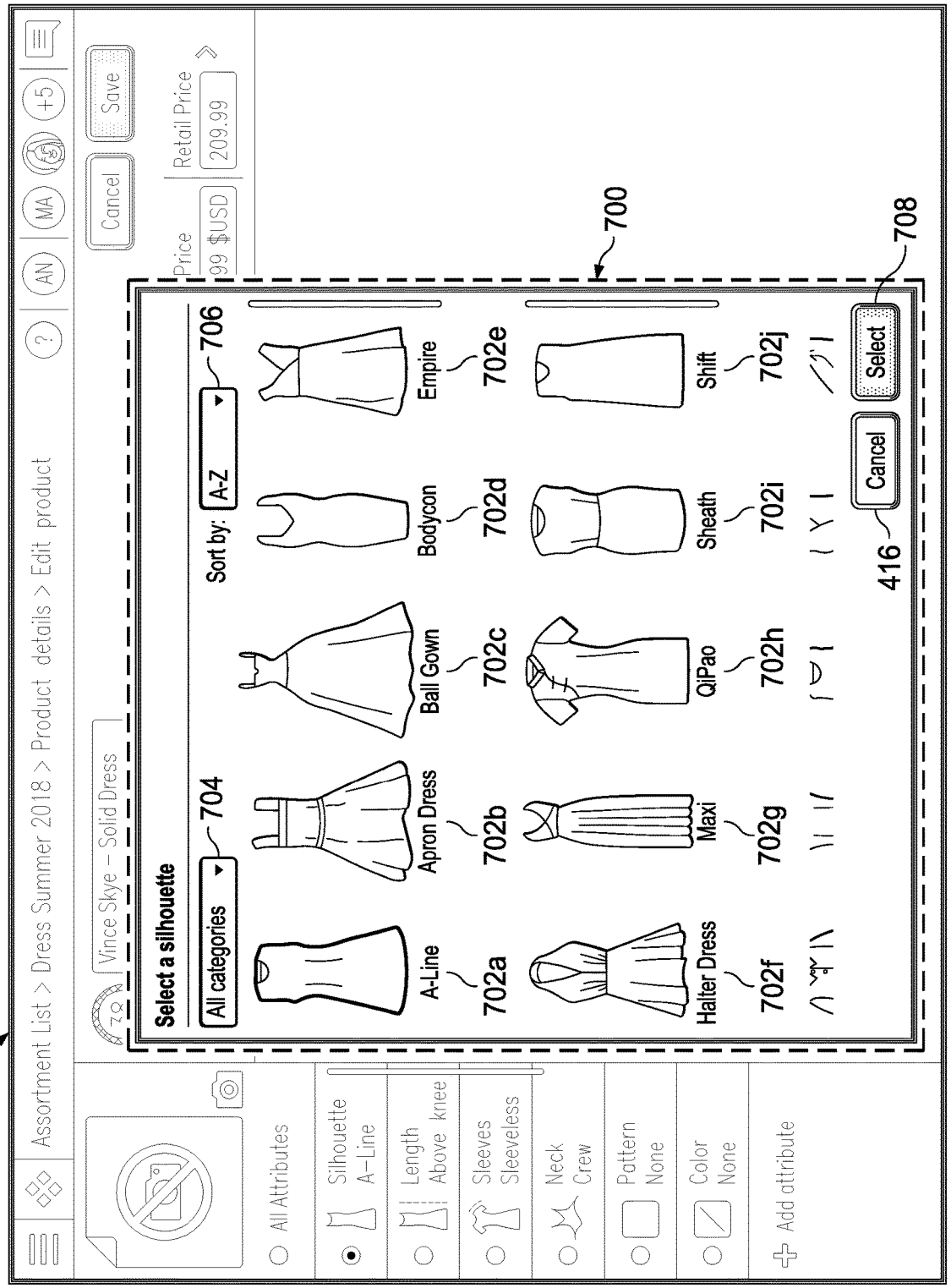
FIG. 7 illustrates a product template selection interface, in accordance with an embodiment.

FIG. 7 illustrates product template selection interface 700, in accordance with an embodiment. Interface engine 204 may render and display product template selection interface 700 in a pop-up window over product design interface 600. Product template selection interface 700 comprises product templates 702a-702j, category selection dropdown 704, sort selection dropdown 706, selection confirmation button 708, and selection cancellation button 416.

Category selection dropdown 704 comprises a user-selectable interactive element that, in response to a user selection, provides for selecting one or more categories of products to display on product selection interface 700. Similarly, sort selection dropdown 706 comprises a user-selectable interactive element that, in response to a user selection, provides for selecting sorting criteria for one or more product templates 702a-702j.

Selection cancellation button 416 comprises a user-selectable interactive element that, in response to a user selection, discards any selected product template 702a-702b and closes product template selection interface 700. Selection confirmation button 708 comprises a user-selectable interactive element that, in response to a user selection, interface engine 204 creates an editable representation of a product based on the selected product template 702a-702j.

Product templates 702a-702j comprise product attributes with initial pre-selected attribute values representing one or more configurations of products for inclusion in production assortment selection 502. By way of example and not of limitation, product templates 702a-702j may represent one or more dress silhouettes for the exemplary dress retail product, described above. Continuing with the exemplary dress retail product, attributes interface engine 204 displays between approximately fifteen and twenty, inclusive, dress silhouettes represented by product templates 702a-702j. The dress silhouetted comprise dress retail products having preconfigured product attributes with initial selections of one or more attribute values to represent, for example, an A-line dress silhouette, an apron dress silhouette, a ball gown dress silhouette, a bodycon dress silhouette, an empire dress silhouette, a halter dress silhouette, a maxi dress silhouette, a qipao dress silhouette, a sheath dress silhouette, and a shift dress silhouette. Although particular dress silhouettes are illustrated and described, embodiments contemplate any number of product templates 702a-702j having any number of preconfigured product attributes with initial selection of one or more product attribute values, according to particular needs.

Figure 8:
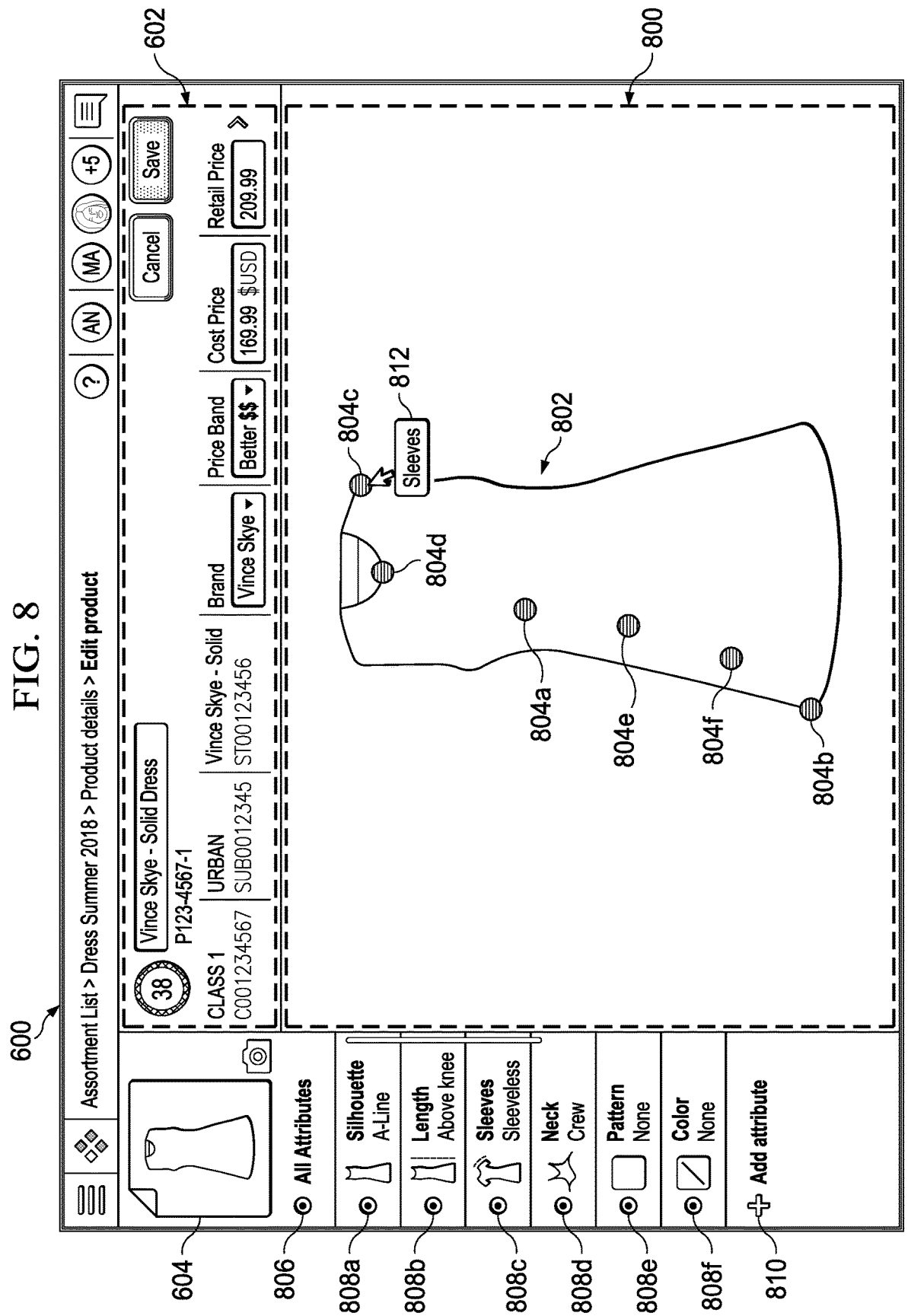
FIG. 8 illustrates a smart attribute product designer of the product design interface of FIG. 6, in accordance with an embodiment.

FIG. 8 illustrates smart attribute product designer 800 of 600 product design interface of FIG. 6, in accordance with an embodiment. Smart attribute product designer 800 comprises product model 802, smart attribute markers 804a-804f, all attribute view selector 806, attribute selectors 808a-808f, add smart attribute button 810, attribute detail popup 812, and product image display area button 814. Smart attribute product designer 800 comprises a virtual canvas providing a virtual workspace to create and modify product model 802 with smart attributes and one or more user interface tools to create a smart attribute product data representation of one or more products that identifies product features using smart attribute and smart attribute value definitions 224. Smart attribute markers 804a-804f comprise user-selectable interactive elements that represent one or more product attributes and which are located near an area, surface, or boundary of the product modified by the one or more product attributes which they represent. Embodiments contemplate more than one smart product marker 804a-804c of the same smart attribute type that may indicate a smart product attribute associated with a particular defined area of a product. For example, a first color smart attribute marker 804e may be associated with a first surface of a product and a second color smart attribute marker 804e may be associated with a second surface of a product. According to embodiments, one or more smart attributes markers 804a-804f comprise movable elements that, in response to movement of an input device during selection of one or more smart attributes markers 804a-804f, (such as, for example, dragging and dropping), the one or more smart attributes markers 804a-804f may be moved to different area, surfaces, or boundaries of product model 802.

All attribute view selector 806 comprises user-selectable interactive element for displaying or hiding all attribute markers 804a-804f. Attribute selectors 808a-808f comprise one or more user-selectable interactive elements for displaying or hiding a corresponding one or more attribute markers 804a-804f. User selection of silhouette attribute selector 808a may hide, display, or open an editing tool for a silhouette smart product attribute of product model 802 represented by silhouette smart attribute marker 804a. User selection of dress length attribute selector 808b may hide, display, or open an editing tool for a dress length smart product attribute of product model 802 represented by dress length smart attribute marker 804b. User selection of sleeves attribute selector 808c may hide, display, or open an editing tool for a sleeves smart product attribute of product model 802 represented by sleeves smart attribute marker 804c. User selection of neck attribute selector 808d may hide, display, or open an editing tool for a neck smart product attribute of product model 802 represented by neck smart attribute marker 804d. User selection of pattern attribute selector 808e may hide, display, or open an editing tool for a pattern smart product attribute of product model 802 represented by pattern smart attribute marker 804e. User selection of color attribute selector 808f may hide, display, or open an editing tool for a color smart product attribute of product model 802 represented by color smart attribute marker 804e.

Add smart attribute button 810 comprises a user-selectable interactive element for creating one or more additional smart attribute markers 804a-804 of one or more of same or different types of product attributes. Attribute detail popup 812 comprises graphic display element that, in response to a user selection of smart attributes markers 804a-804f indicating the identity of the attribute and/or attribute value represented by the selected smart attributes markers 804a-804f. Continuing with the exemplary dress retail product, smart attribute product designer 800 displays a product model based on the selected product template 702a comprising an A-line dress silhouette. In addition, product image display area 604 is updated to display an image rendered from the product model 802 and representing a product image generated from the selected product attribute values. In addition, smart product attributes associated with smart attribute markers 804a-804f and/or attribute selectors 808a-808f are updated to reflect the initial attribute values preconfigured in the selected product template 702a for the A-line dress silhouette. For example, the initial values of the product attributes include A-line (for silhouette), above the knee (for length), sleeveless (for sleeves), crew (for neck), none (for pattern), and none (for color).

Figure 9:
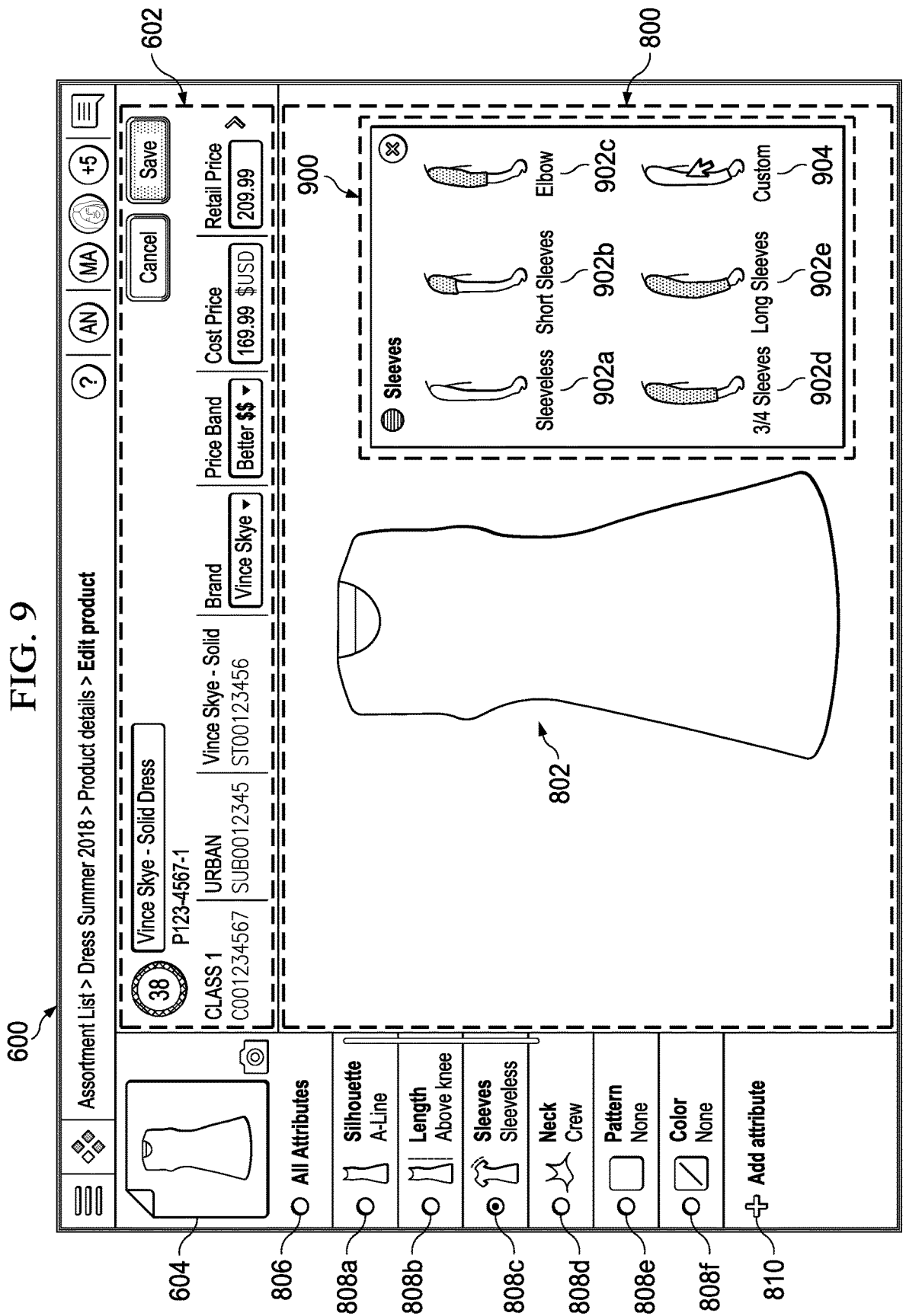
FIG. 9 illustrates a smart attribute value modification by the smart attribute product designer of FIG. 8 in accordance with an embodiment.

FIG. 9 illustrates a smart attribute value modification by smart attribute product designer 800 of FIG. 8 in accordance with an embodiment. To modify a sleeves attribute value and add sleeves to the product model, a user may select sleeves smart attribute marker 804c. In response to and at least partially based on selection of sleeves smart attribute marker 804c, smart product attribute designer 800 displays attribute selection interface 900 comprising one or more selectable product attribute values 902a-902e for sleeves smart attribute. By way of example and not of limitation, sleeves attribute has possible attribute values of sleeveless, short sleeves, elbow, ¾ sleeves, long sleeves, and custom sleeves. Although the dress is illustrated as comprising particular attribute values for a sleeves attributes, embodiments contemplate any product with any selectable product attributes and attribute values. In addition or in the alternative, in response to and at least partially based on selection of custom sleeve selectable product attribute value 904, the user may select custom, and smart product attribute designer 800 is updated to illustrate an outline of sleeves that may be customized by the user.

Figure 10:
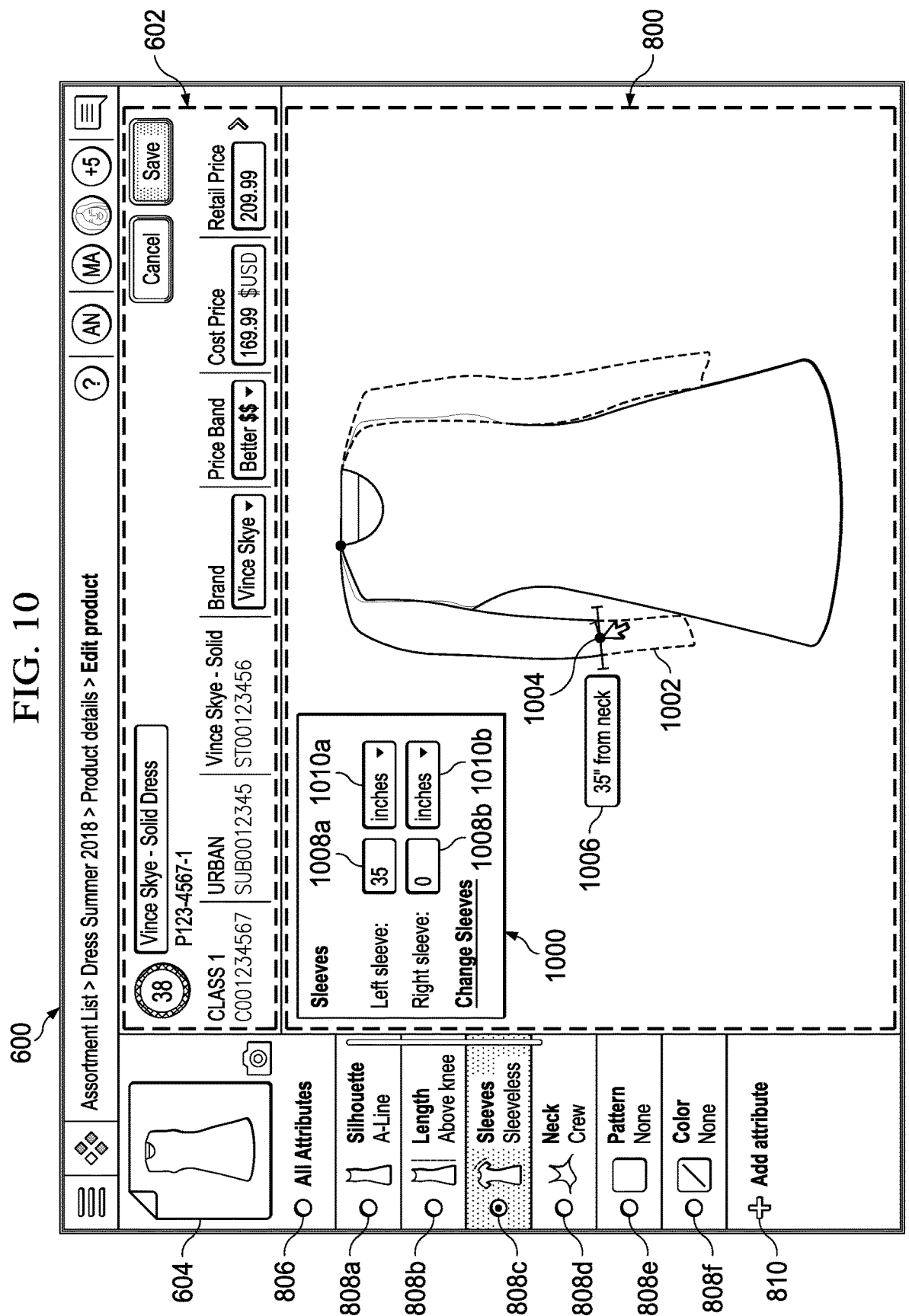
FIGS. 10-11 illustrate smart attribute value customization by the smart attribute product designer of FIG. 8 for an exemplary sleeve attribute, in accordance with an embodiment.
Figure 11:
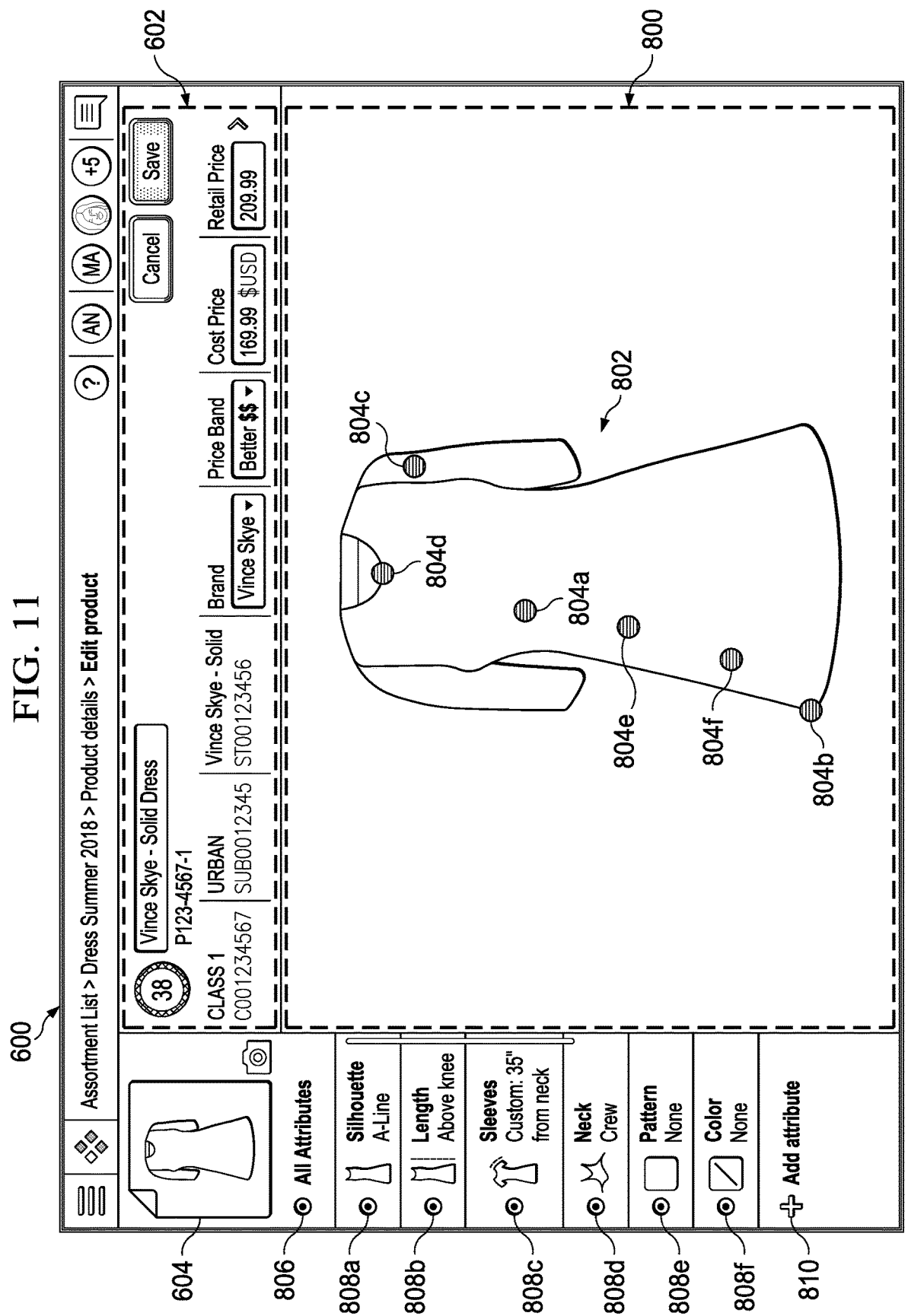

FIGS. 10-11 illustrate smart attribute value customization by smart attribute product designer 800 of FIG. 8 for an exemplary sleeve attribute, in accordance with an embodiment.

FIG. 10 illustrates custom smart attribute value selection interface 1000 for smart attribute value customization by smart attribute product designer 800 of FIG. 8 for an exemplary sleeve attribute, in accordance with an embodiment. In response to and based partially on user selection of custom sleeve selectable product attribute value 904, smart product attribute designer 800 displays custom smart attribute value selection interface 1000, custom attribute outlines 1002, attribute value selection icon 1004, and custom smart attribute value popup 1006. Custom smart attribute value selection interface 1000 comprises left and right text entry boxes 1008*a*-1008*b* and left and right measure drop-down selection boxes 1010*a*-1010*b*. According to embodiments, smart product attribute designer 800 provides for custom smart attribute value selection by directly inputting the value into left and right text entry boxes 1008*a*-1008*b* of custom smart attribute value selection interface 1000. Although inches are illustrated, left and right measure drop-down selection boxes 1010*a*-1010*b* provide for selecting a different unit of measurement, such as, for example, centimeters, or the like.

In response to and based at least partially on selection of outlines 1000, smart attribute product designer 800 displays attribute value selection icon 1002, which provides for selection of an attribute value based on the movement of attribute value selection icon 1002.

Attribute value selection icon 1004 may comprise slideable bar, wherein the intersection of the slideable bar with outlines 1002 determines the smart attribute value. In the illustrated example, sliding the attribute value selection icon 1004 determines the length of the sleeve smart attribute by determining the sleeve smart attribute value. As the attribute value selection icon 1004 is moved in relation to the length of the sleeves, the sleeve-length for the dress is indicated by the spot where the user drags and drops the icon.

According to embodiments, left and right text entry boxes 1008*a*-1008*b* display a custom smart attribute value that is updated automatically based on the intersection of custom attribute outlines 1002 and attribute value selection icon 1004. For example, left text entry boxe 1008*a* indicates the dress sleeves are thirty-five inches in length. Smart product attribute designer 800 records the value of the attribute selected by the user, in this instance, the precise numerical value.

FIG. 11 illustrates updating product model 802 in response to smart attribute value customization by smart attribute product designer 800 of FIG. 8 for an exemplary sleeve attribute, in accordance with an embodiment. When a custom smart attribute value is selected, smart product attribute designer 800 displays an updated product model 802 comprising the customized smart attribute and stores updated smart attribute product data in product data 212. In addition, product image display area 604 is updated to represent a current product image based on the updated product model 802 comprising custom smart attribute values. For example, product image of product image display area 604 displays a dress retail product with customized sleeves indicating the customized sleeve length.

Figure 12:
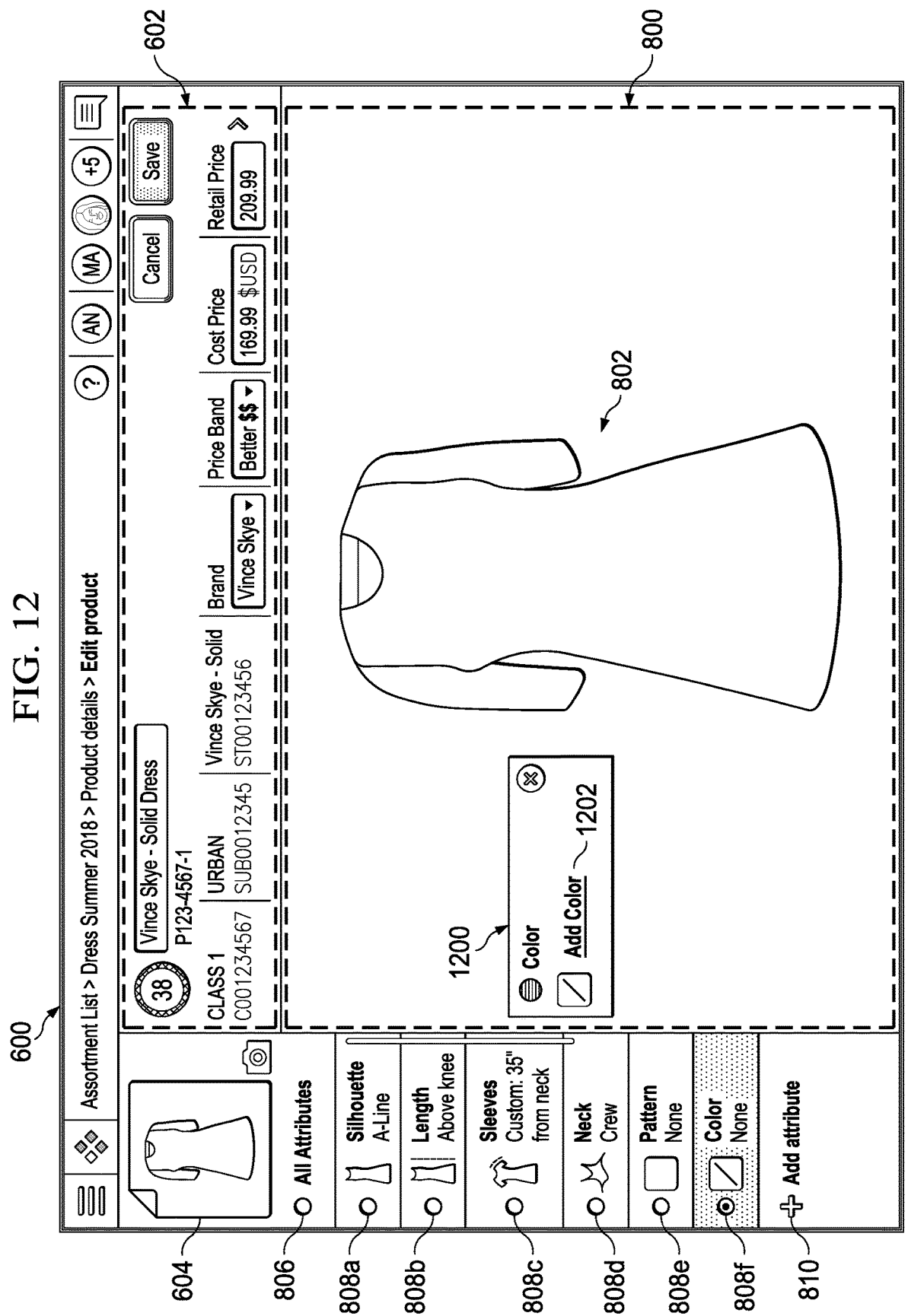
FIG. 12 illustrates smart attribute value customization by the smart attribute product designer of FIG. 8 for an exemplary color attribute, in accordance with an embodiment.

FIG. 12 illustrates smart attribute value customization by smart attribute product designer 800 of FIG. 8 for an exemplary color attribute, in accordance with an embodiment. In addition to selection of custom sleeve length, smart product attribute designer 800 provides for custom color smart product attributes. In response to and at least partially based on user selection of the color attribute selector 808*f*, smart product attribute designer 800 displays color attribute selection interface 1200. Color attribute selection interface 1200 comprises add color selectable element 1202, which, in response to a user selection, provides for selecting one or more color attributes for one or more areas of product model 802.

Figure 13:
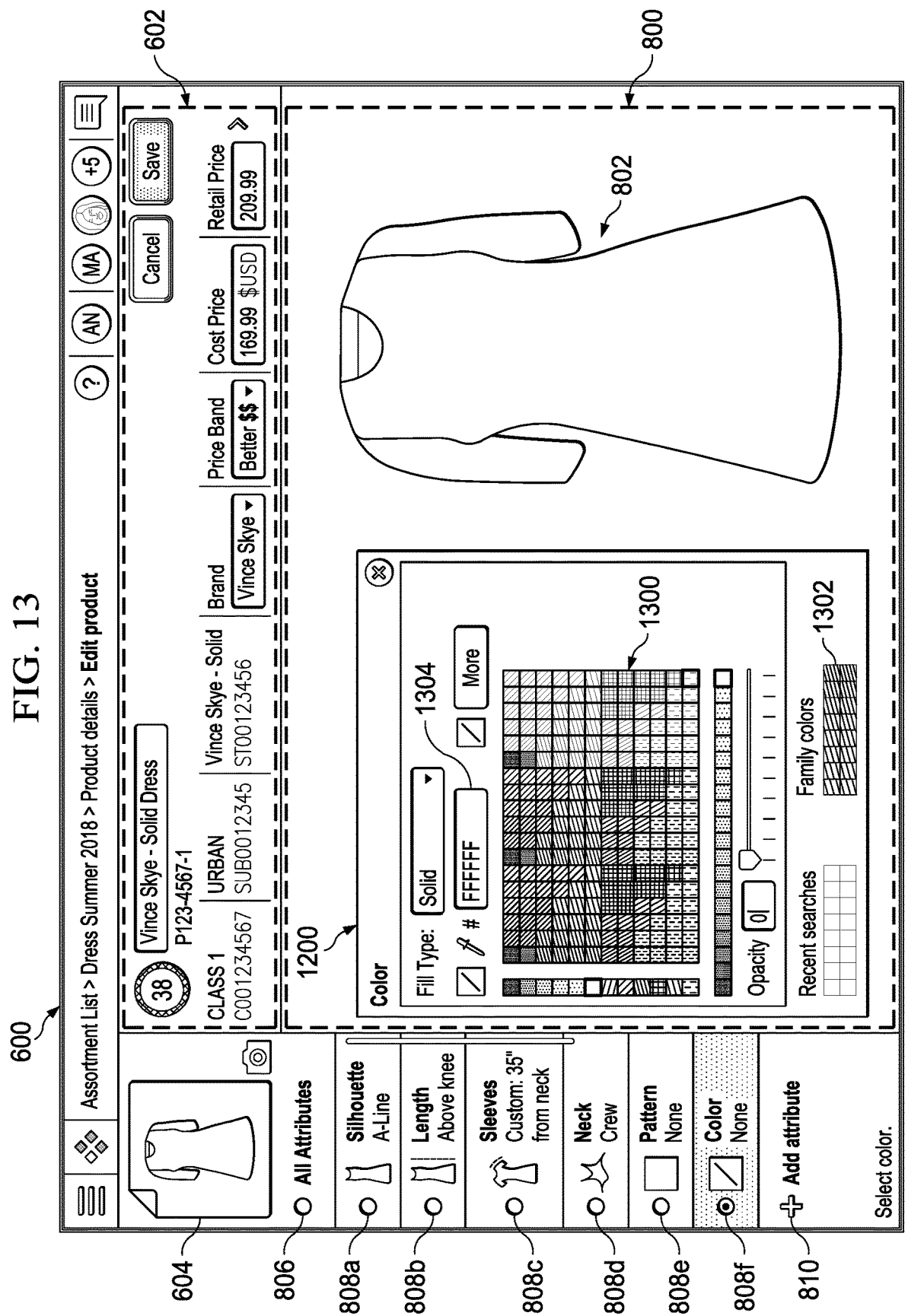
FIG. 13 illustrates a color attribute selection interface, in accordance with an embodiment.

FIG. 13 illustrates color attribute selection interface 1200, in accordance with an embodiment. In this example, color attribute selection interface 1200 display one or more user-selectable interactive elements for selecting a color (color selector 1300), selecting a family of colors (family color selector 1302), or inputting a code to select the color represented by the code input (color code entry box 1304). Retail planner 110 records and stores color attributes using a particular code that singularly identifies a particular color or range of colors to provide consistency across product attributes and attribute values. In addition, embodiments contemplate retail planner 110 generating a color identifier in response to user selection of a particular color and based on identified attribute values for products dresses having a similar color as the selected color.

For example, if retail planner 110 identifies a product having 80% of its color similar to the selected color, then the retail planner 110 may suggest the same name for future products having the same selected color. By way of a more particular example, a dress of exemplary fashion retailer may comprise a color similar to the selected color. Retail planner may then suggest the identified color name, ('blue sky') or the name for its color family ('light. blue') to eliminate the need for the buyer to suggest or manually enter color attribute values. Although suggestion of a particular attribute value based on a custom or selected color is illustrated, embodiments contemplate suggestion of a name for a particular attribute, range of attributes, or family of attributes according to particular needs.

Figure 14:
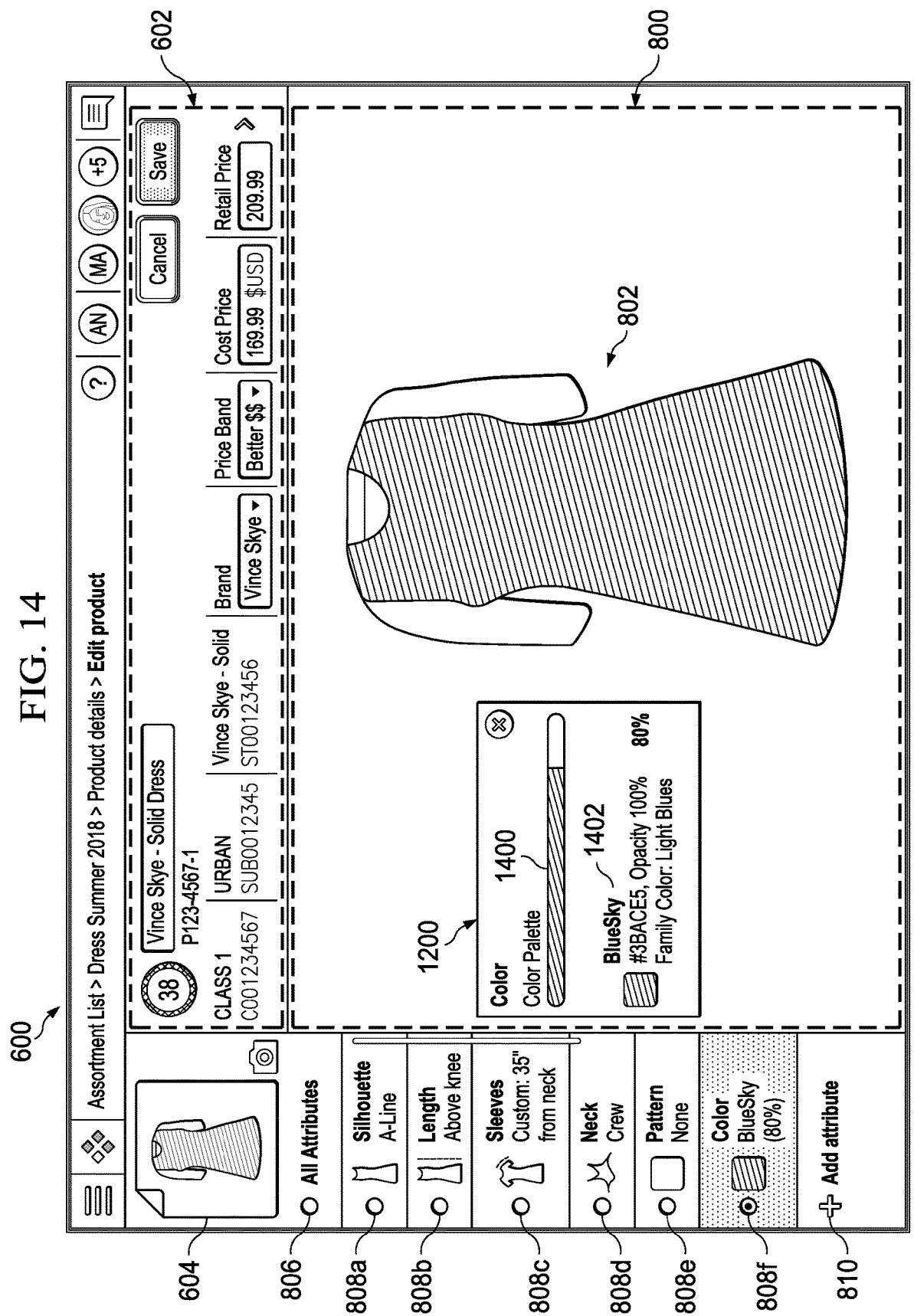
FIG. 14 illustrates a first color attribute selection for a product model, in accordance with an embodiment.

FIG. 14 illustrates a first color attribute selection for product model 802, in accordance with an embodiment. Color attribute selection interface 1200 comprises color palette 1400 and selected first color attribute 1402. Product model 802 may comprise a color determined by selection of one or more colors using color selector 1300, family color selector 1302, and/or color code entry box 1304. According to embodiments, smart attributes product designer 800 comprises one or more user interface tools for editing one or more images or models, including, for example, eraser tools, paintbrush tools, color fill tools, or the like. In response to selection of one or more colors and one or more tools smart attributes product designer 800 adds, removes, or modifies one or more colors on product model 802. Continuing with the exemplary fashion retailer, the dress represented by product model 802 may be colored using the selected first color attribute 1402 as indicated in color palette 1400. Even when color is added to the product model 802 quickly and without filling a substantial amount of area of product model 802, smart attribute product designer 800 automatically fills remaining areas of the product using selected first color attribute 1402. Based at least partially on and in response to the paintbrush tool and a user-selected color, smart attributes product designer 800 fills remaining areas of the product model with the color "blue sky." Smart attributes product designer 800 may display on color attribute selection interface 1200, in response to a user selection of one or more colors, one or more color details, including, for example, a color name, a color identification number, a color opacity, a color family, a percentage of the color on the product, and the like.

Figure 15:
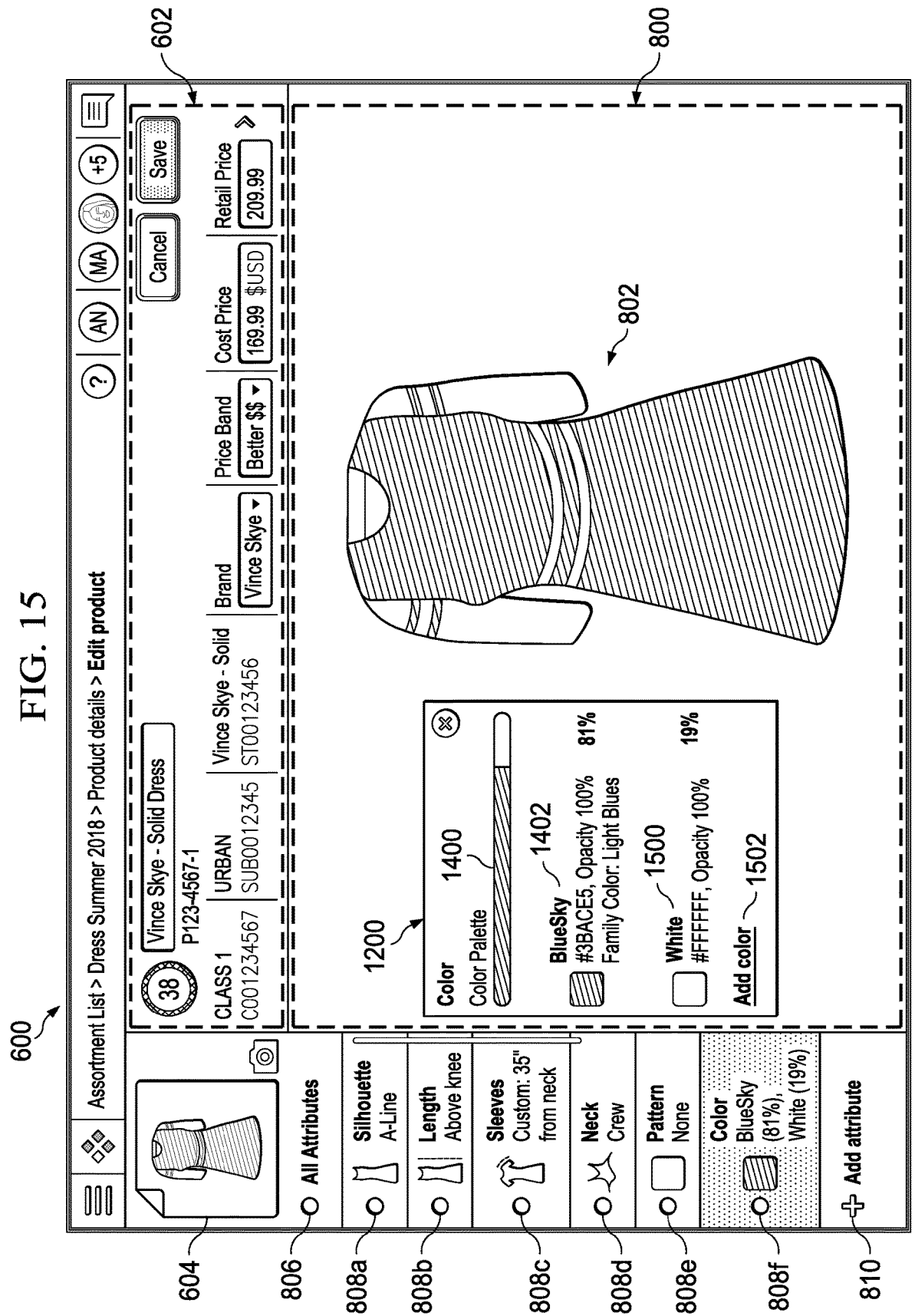
FIG. 15 illustrates a second color attribute selection for a product model, in accordance with an embodiment.

FIG. 15 illustrates a second color attribute selection for product model 802, in accordance with an embodiment. Color attribute selection interface 1200 comprises selected second color attribute 1500 and add color attribute link 1502. Embodiments of retail planner 110 provide for adding one or more additional colors to a product by selecting add color attribute link 1502 to add one or more additional selected color attribute, such as second selected color attribute 1500. For the dress of the exemplary clothing retailer, a user adds blue stripes to the dress sleeves and white stripes to dress waist using a paintbrush tool. Although the product is described and illustrated with two additional colors, embodiments contemplate any number of one or more additional colors added to a product using one or more color selection and drawing tools, according to particular needs. In addition, or the alternative, one or more products may comprise one or more additional product attributes that may come directly from one or more supply chain entities such as, for example, supplier 152. The additional product attributes may be represented by one or more smart attribute markers 808*a*-808*f* even when the product attributes are not visible or displayed on product model 802, such as, for example, product name, brand, cost price, retail price, and the like. In addition, or in the alternative, one or more product attributes and product attribute values may be displayed on product toolbar 602. Embodiments of retail planner 110 contemplate automatically generating a naming and description for one or more products or generating some attributes, such as price and cost, based at least partially on attributes of other similar products and selected product attributes.

As described above in connection with FIG. 6, a product design interface 600 display user-selectable interactive elements for creating a new product from a selected placeholder by either selecting product template selection button 610 or product image features identification button 612. Creating a product from a selected product template using product template selection button 610 ("select a silhouette") was described above. Creating a product by uploading a product image in response to selecting product image features identification button 612 is described in connection with the following figures.

Figure 16:
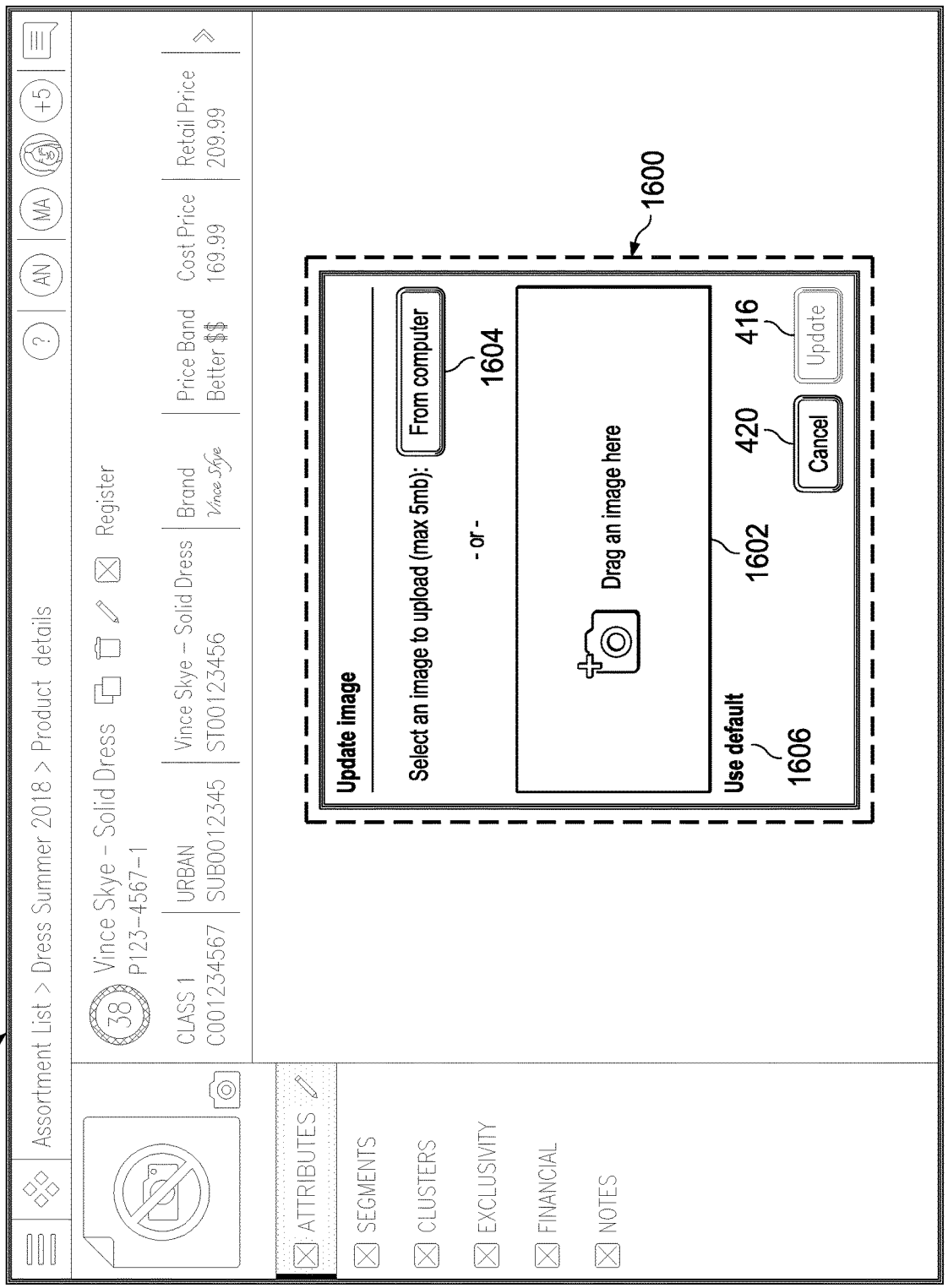
FIG. 16 illustrates a product image upload interface, in accordance with an embodiment.

FIG. 16 illustrates product image upload interface 1600, in accordance with an embodiment. In response to and at least partially based on selection of product image features identification button 612, product design interface 600 displays product image upload interface 1600. Product image upload interface comprises one or more interactive elements for uploading a product image including, drag and drop element 1602, file browser upload 1604, and default selector 1606. According to embodiments, drag and drop element 1602 provides a detection region comprising an area represented on the display by the boundaries of the drag and drop element 1602. When interface engine 204 senses one or more images in the detection region, such as by a drag and drop technique with input 152 and an image file, interface engine 204 selects the detected product image as the product image upload. File browser upload 1604 similarly provides for selection (using a file and directory navigation tree) of a product image which is then selected as the product image upload.

Figure 17:
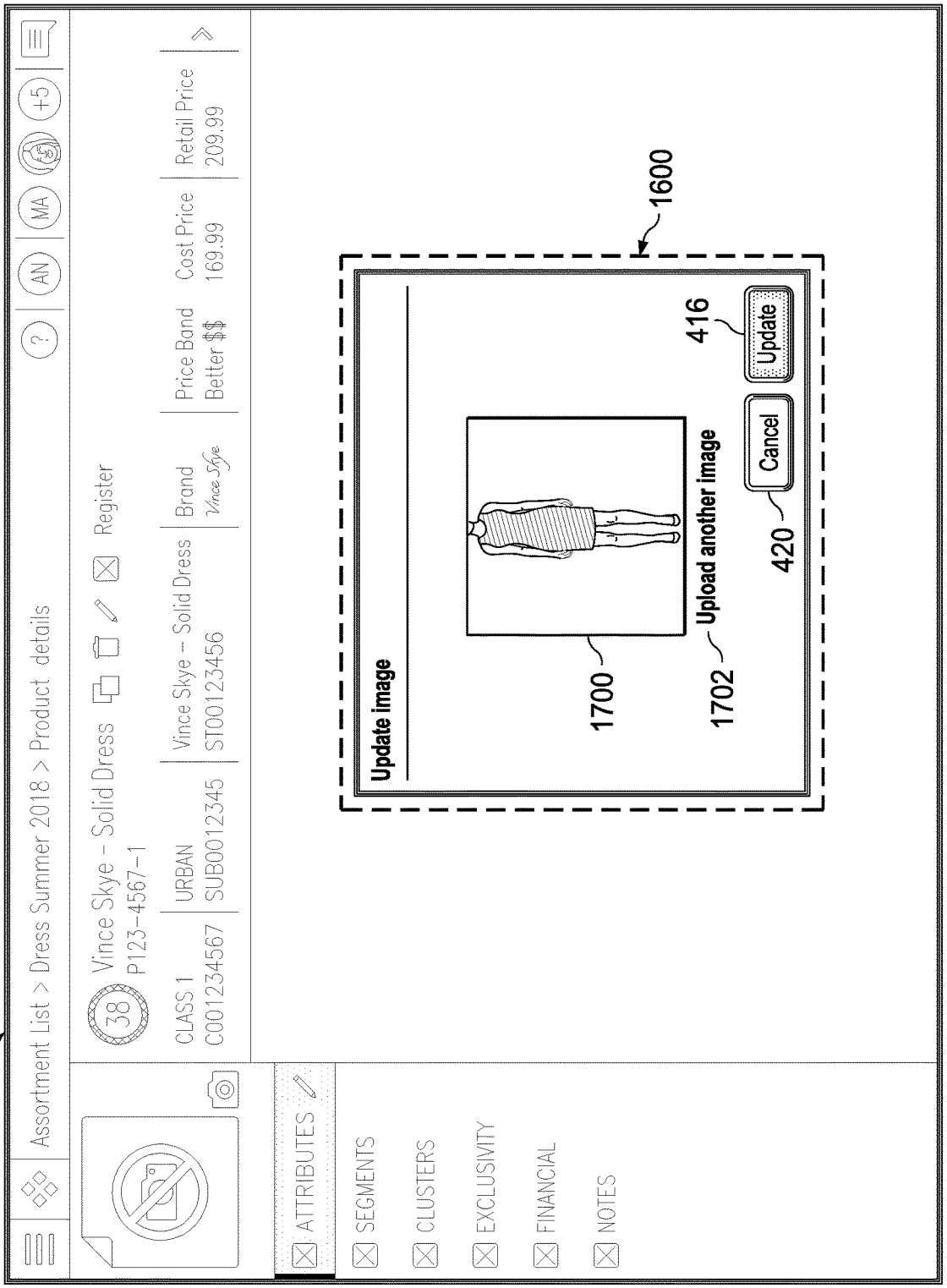
FIG. 17 illustrates completion of image upload by the product image upload interface of FIG. 16, in accordance with an embodiment.

FIG. 17 illustrates completion of image upload by product image upload interface 1600 of FIG. 16, in accordance with an embodiment. In response to selecting one or more product images for upload, product image upload interface 1600 displays preview image 1700 and upload another image link 1702. When an image is successfully uploaded, preview image 1700 displays the contents of the uploaded image, providing visual confirmation that the correct image file was uploaded. When preview image 1700 displays the correct product image, update button 416 is selected, and, in response to selection of update button 416, interface engine 204 communicates the uploaded product image to image processing module 206, which may use machine learning techniques to detect a product or product features from the uploaded image. When the preview image 1700 does not display the correct product image, a user may select either upload another image link 1702 or cancel button 420. Selection of upload another image link 1702 provides one or more interactive visual elements for uploading one or more additional product images. Selection of cancel button 420 closes product image upload interface 1600 and does not communicate the uploaded product image to image processing module 206.

For the illustrated fashion retailer, the uploaded image comprises a woman wearing a light-colored dress. In response to and at least partially based on user selection of update button 416, image processing module 206 of retail planner 110 may use machine learning techniques to identify the silhouette of the dress in the image or one or more other product features. Although a particular product image is illustrated and described, embodiments contemplate uploading images of one or more other retail products for feature detection, according to particular needs.

Figure 18:
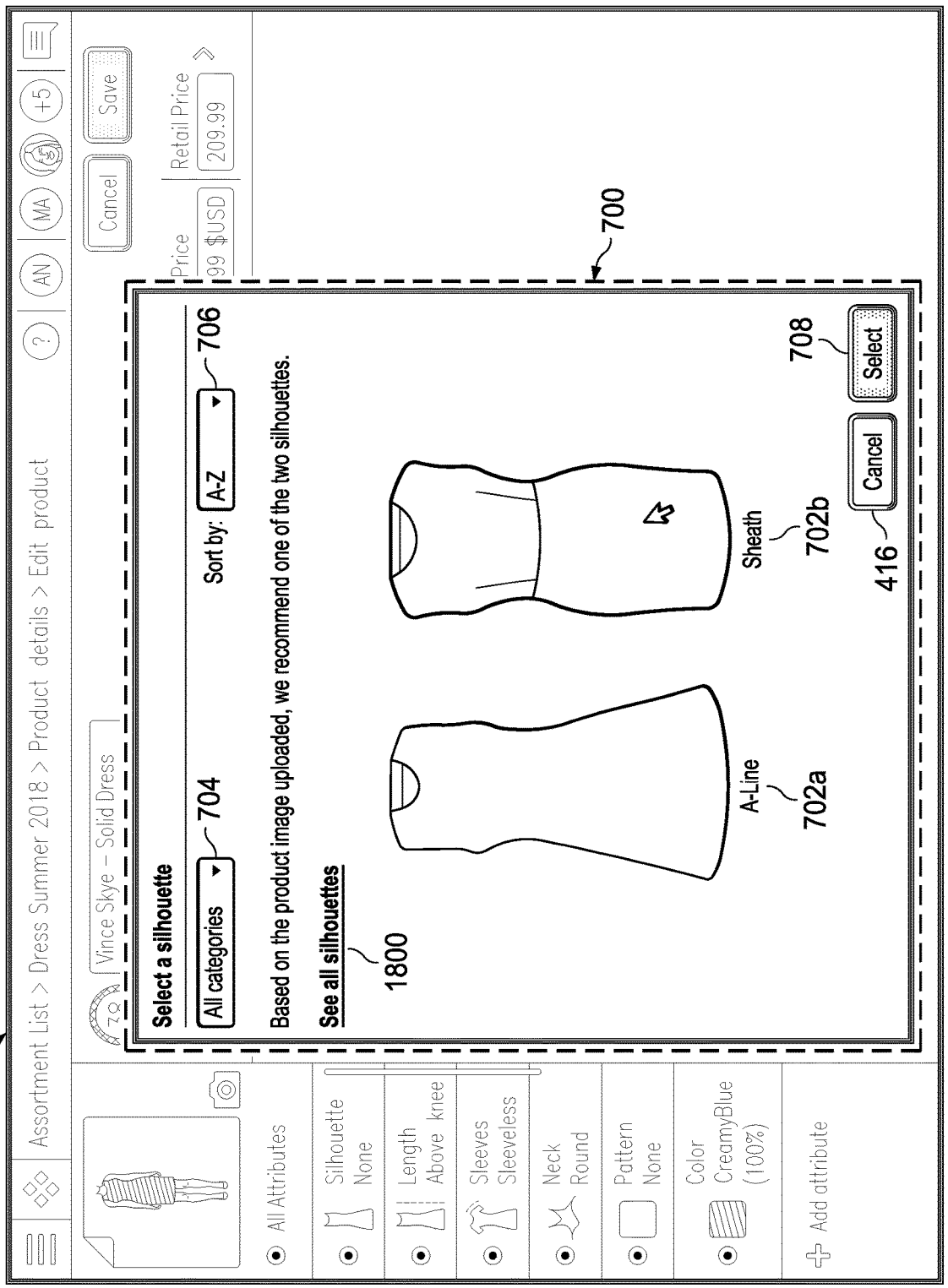
FIG. 18 illustrates a product template selection interface displaying product templates recommended for an uploaded product image, in accordance with an embodiment.

FIG. 18 illustrates product template selection interface 700 displaying product templates recommended for uploaded product image, in accordance with an embodiment. Interface engine 204 may render and display product template selection interface 700 in a pop-up window over product design interface 600. Product template selection interface 700 comprises product templates 702*a*-702*b*, category selection dropdown 704, sort selection dropdown 706, selection confirmation button 708, selection cancellation button 416, and see all silhouettes link 1800.

Recommended product templates 702*a*-702*b* comprise the product templates having attributes and attribute values most similar to one or more product features of the product in uploaded product image. Based upon the uploaded product image, retail planner 110 determines two dress silhouettes: A-Line 702*a* and Sheath 702*b*, are analogous to the product displayed in the uploaded product image according to one or more product features.

As described above, category selection dropdown 704 comprises a user-selectable interactive element that, in response to a user selection, provides for selecting one or more categories of products to display on product selection interface 700. Similarly, sort selection dropdown 706 comprises a user-selectable interactive element that, in response to a user selection, provides for selecting sorting criteria for one or more product templates 702*a*-702*b*.

See all attributes link 1800 provides for viewing all product templates, 702*a*-702*j*, not only recommended product templates 702*a*-702*b*. Although the user interface recommends one or more product templates 702*a*-702*b*, embodiments contemplate allowing a user to view all product templates 702a-702j and select any one or more additional product templates 702a-702j or product images which the user believes are better representations of the uploaded image. Embodiments also contemplate the user interface to record the selection made by the user which can be used with machine learning to allow the user interface to score its guess based on the image uploaded and the template it recommended to improve the algorithm the interface uses when it identifies future images.

Selection cancellation button 416 comprises a user-selectable interactive element that, in response to a user selection, discards any selected product template 702a-702b and closes product template selection interface 700. Selection confirmation button 708 comprises a user-selectable interactive element that, in response to a user selection, interface engine 204 creates an editable representation of a product based on the selected product template 702a-702b.

FIG. 19 illustrates product model 802 of an uploaded product image generated by smart attribute product designer 800 of FIG. 8, in accordance with an embodiment. As described above, smart attribute product designer 800 comprises product model 802, smart attribute markers 804a-804f, all attribute view selector 806, attribute selectors 808a-808f, and add smart attribute button 810. As can be seen in product image display area 604, the product image that represents the product has been saved as the uploaded product image. In addition, smart product attributes associated with smart attribute markers 804a-804f and/or attribute selectors 808a-808f are updated to reflect the initial attribute values preconfigured in the selected product template 702a for the A-line dress silhouette. For example, the initial values of the product attributes include A-line (for silhouette), above the knee (for length), sleeveless (for sleeves), crew (for neck), none (for pattern), and none (for color).

Continuing with the exemplary dress retail product, smart attribute product designer 800 displays a product model based on the selected product template 702a comprising an A-line dress silhouette. In addition, smart product attributes associated with smart attribute markers 804a-804f and/or attribute selectors 808a-808f are updated to reflect the initial attribute values preconfigured in the selected product template 702a for the A-line dress silhouette. For example, the initial values of the product attributes include A-line (for silhouette), above the knee (for length), sleeveless (for sleeves), crew (for neck), none (for pattern), and none (for color).

Now the user may review the determined attributes and attribute values and determine if they match the automatically detected values from the user interface. The user may edit or select any one or more additional attributes and update the product data 212 to match the attribute values desired by the user. Once these attributes are entered, the user may select a cancel button 1900 or save button 1902. In response to and based partially on user selection of the cancel button 1900, the product attributes and attribute values will not be saved and the user interface may return to a product selection screen or the landing page, according to particular needs. In response to and based partially on user selection of the save button 1902, the product attributes and attribute values will be saved by the user interface and the values will be more accurate since they are retrieved from the list of smart attributes and smart attribute values.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for assortment planning using smart attributes by a computer, comprising:
generating one or more new products for a product class using one or more automatically generated templates comprising a graphical representation of a product using a first smart product attribute value;
generating a user interface comprising a virtual canvas having a display area and rendering a product model for display on the display area of the virtual canvas, wherein attribute values of the product model correspond to product features of a modeled product;
displaying a graphic representation of the product model that represents the attribute values of the product model; and
causing items to be transported among one or more supply chain entities in a supply chain network to restock an inventory of one or more items according to a current state of items in the supply chain network and one or more new products.

2. The computer-implemented method of claim 1, further comprising:
calculating contribution of different product features from encoded smart attribute values; and
generating predictions for product features that will affect future demand for a new product assortment.

3. The computer-implemented model of claim 2, further comprising:
detecting user input on the virtual canvas in connection with the displayed representations of the attribute values of the product model.

4. The computer-implemented model of claim 3, wherein the virtual canvas comprises one or more tools and further comprising:
modifying the attribute values of the product model in accordance with one or more tools that alter the displayed representations of the attribute values of the product model.

5. The computer-implemented model of claim 4, further comprising:
using smart attribute definitions to update the attribute values of a data representation of the product according to the modified attribute values.

6. The computer-implemented model of claim 4, further comprising:
displaying a product image upload interface of the user interface;
receiving one or more images of one or more planned assortment products by the product image upload interface; and
generating one or more planned assortment product models comprising attributes and attribute values corresponding to one or more recommended templates comprising one or more attribute values that correspond to one or more of features of the planned assortment products.

7. The computer-implemented model of claim 6, wherein the one or more new products are clothing, and the product features encoded by the smart attribute values are grouped into one or more smart attributes that correspond to one or more of a color, material, design, pattern, and size.

8. A system for assortment planning using smart attributes, comprising:
a computer comprising a processor and a memory, the computer configured to:
generate one or more new products for a product class using one or more automatically generated templates comprising a graphical representation of a product using a first smart product attribute value;
generate a user interface comprising a virtual canvas having a display area and render a product model for display on the display area of the virtual canvas, wherein attribute values of the product model correspond to product features of a modeled product;
display a graphic representation of the product model that represents the attribute values of the product model; and
cause items to be transported among one or more supply chain entities in a supply chain network to restock inventory of one or more items according to a current state of items in the supply chain network and one or more new products.

9. The system of claim 8, wherein the computer is further configured to:
calculate contribution of different product features from encoded smart attribute values; and
generate predictions for product features that will affect future demand for a new product assortment.

10. The system of claim 9, wherein the computer is further configured to:
detect user input on the virtual canvas in connection with the displayed representations of the attribute values of the product model.

11. The system of claim 10, wherein the virtual canvas comprises one or more tools and the computer is further configured to:
modify the attribute values of the product model in accordance with one or more tools that alter the displayed representations of the attribute values of the product model.

12. The system of claim 11, wherein the computer is further configured to:
use smart attribute definitions to update the attribute values of a data representation of the product according to the modified attribute values.

13. The system of claim 12, wherein the computer is further configured to:
display a product image upload interface of the user interface;
receive one or more images of one or more planned assortment products by the product image upload interface; and
generate one or more planned assortment product models comprising attributes and attribute values corresponding to one or more recommended templates comprising one or more attribute values that correspond to one or more of features of the planned assortment products.

14. The system of claim 13, wherein the one or more new products are clothing, and the product features encoded by the smart attribute values are grouped into one or more smart attributes that correspond to one or more of a color, material, design, pattern, and size.

15. A non-transitory computer-readable medium embodied with software for assortment planning using smart attributes, the software when executed is configured to:
generate one or more new products for a product class using one or more automatically generated templates comprising a graphical representation of a product using a first smart product attribute value;
generate a user interface comprising a virtual canvas having a display area and render a product model for display on the display area of the virtual canvas, wherein attribute values of the product model correspond to product features of a modeled product;
display a graphic representation of the product model that represents the attribute values of the product model; and
cause items to be transported among the one or more supply chain entities in a supply chain network to restock inventory of one or more items according to a current state of items in the supply chain network and the one or more new products.

16. The non-transitory computer-readable medium of claim 15, wherein the software when executed is further configured to:
calculate contribution of different product features from encoded smart attribute values; and
generate predictions for product features that will affect future demand for a new product assortment.

17. The non-transitory computer-readable medium of claim 16, wherein the software when executed is further configured to:
detect user input on the virtual canvas in connection with the displayed representations of the attribute values of the product model.

18. The non-transitory computer-readable medium of claim 17, wherein the virtual canvas comprises one or more tools and the software when executed is further configured to:
modify the attribute values of the product model in accordance with one or more tools that alter the displayed representations of the attribute values of the product model.

19. The non-transitory computer-readable medium of claim 18, wherein the software when executed is further configured to:
use smart attribute definitions to update the attribute values of a data representation of the product according to the modified attribute values.

20. The non-transitory computer-readable medium of claim 19, wherein the software when executed is further configured to:
display a product image upload interface of the user interface;
receive one or more images of one or more planned assortment products by the product image upload interface; and
generate one or more planned assortment product models comprising attributes and attribute values corresponding to one or more recommended templates comprising one or more attribute values that correspond to one or more of features of the planned assortment products.

* * * * *